United States Patent
Murillo et al.

(10) Patent No.: US 8,631,355 B2
(45) Date of Patent: Jan. 14, 2014

(54) ASSIGNING GESTURE DICTIONARIES

(75) Inventors: Oscar E. Murillo, Redmond, WA (US); Andy Wilson, Seattle, WA (US); Alex A. Kipman, Duvall, WA (US); Janet Galore, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 12/684,518

(22) Filed: Jan. 8, 2010

(65) Prior Publication Data

US 2011/0173204 A1 Jul. 14, 2011

(51) Int. Cl.
*G06F 3/033* (2013.01)

(52) U.S. Cl.
USPC ......................................................... 715/863

(58) Field of Classification Search
USPC .................................................. 715/863, 864
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

An API for Hands-Free Gesture-Based Human-Computer Interaction—Published Date: May 4, 2005 http://www.dcs.shef.ac.uk/intranet/teaching/projects/archive/ug2005/pdf/u1pm.pdf.

(Continued)

*Primary Examiner* — Thanh Vu
(74) *Attorney, Agent, or Firm* — Woodcock Washburn, LLP

(57) ABSTRACT

Techniques for assigning a gesture dictionary in a gesture-based system to a user comprise capturing data representative of a user in a physical space. In a gesture-based system, gestures may control aspects of a computing environment or application, where the gestures may be derived from a user's position or movement in a physical space. In an example embodiment, the system may monitor a user's gestures and select a particular gesture dictionary in response to the manner in which the user performs the gestures. The gesture dictionary may be assigned in real time with respect to the capture of the data representative of a user's gesture. The system may generate calibration tests for assigning a gesture dictionary. The system may track the user during a set of short gesture calibration tests and assign the gesture dictionary based on a compilation of the data captured that represents the user's gestures.

21 Claims, 11 Drawing Sheets

(56) References Cited

U.S. PATENT DOCUMENTS

| | | |
|---|---|---|
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 * | 7/2001 | Nguyen ............ 715/863 |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |

(56) References Cited

U.S. PATENT DOCUMENTS

| | | | |
|---|---|---|---|
| 8,035,614 B2 | 10/2011 | Bell et al. | |
| 8,035,624 B2 | 10/2011 | Bell et al. | |
| 8,072,470 B2 | 12/2011 | Marks | |
| 2006/0031786 A1 | 2/2006 | Hillis et al. | |
| 2006/0227116 A1* | 10/2006 | Zotov et al. | 345/173 |
| 2007/0177804 A1* | 8/2007 | Elias et al. | 382/188 |
| 2007/0243926 A1* | 10/2007 | Cheng | 463/23 |
| 2008/0026838 A1 | 1/2008 | Dunstan et al. | |
| 2008/0225041 A1 | 9/2008 | El Dokor et al. | |
| 2008/0231926 A1 | 9/2008 | Klug et al. | |
| 2009/0052785 A1* | 2/2009 | Shamaie | 382/209 |
| 2011/0199338 A1* | 8/2011 | Kim | 345/175 |
| 2012/0019684 A1* | 1/2012 | Yang et al. | 348/222.1 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO2009062153 A1 | 5/2009 |

OTHER PUBLICATIONS

Apple Developing Configurable Multi-Touch Gesture Dictionary—Published Date: Aug. 2, 2007 http://www.appleinsider.com/articles/07/08/02/apple_developing_configurable_multi_touch_gesture_dictionary.html.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

ASSIGNING GESTURE DICTIONARIES

BACKGROUND

Many computing applications such as computer games, multimedia applications, office applications or the like use controls to allow users to manipulate characters or control other aspects of an application. Typically such controls are input using, for example, controllers, remotes, keyboards, mice, or the like. Unfortunately, such controls can be difficult to learn, thus creating a barrier between a user and such applications. Furthermore, such controls may be different than actual actions for which the controls are used. For example, a game control that causes a game character to swing a baseball bat may be a combination of buttons and may not correspond to an actual motion of swinging the baseball bat, or a control to reposition a view on a screen, such as repositioning the view of a map in a map application, may be a selection of arrow buttons on a keyboard and may not correspond to the actual motion of the files.

A system of commands that are universal to all users inhibits a user's personalized experience with the system and/or application. Often, users with fundamentally different preferences on how to issue commands are forced to use a unified input module for issuing such commands. However, simply allowing the user to adjust the definition of the command to personalize each command for the user may be a laborious task and the user may not remember the changes, especially when there are a large number of possible commands.

SUMMARY

Disclosed herein are techniques for assigning a gesture dictionary in a gesture-based system to a user, where the gesture dictionary corresponds to captured data representative of the user's gestures. In a gesture-based system, gestures may control aspects of a computing environment or application, where the gestures may be derived from a user's position or movement in a physical space. A gesture-based system may comprise any number or combination of capture devices, display devices, processors, input devices, etc. A capture device may capture data representative of a user in a physical space. A display device may display a visual representation of the user that corresponds to the user's gestures. A processor may process the captured data to determine a user's gesture and translate the gesture into a control of an aspect of the gesture-based system.

In an example embodiment, the system may monitor a user's gestures and select a particular gesture dictionary in response to the manner in which the user performs the gestures. The gesture dictionary may be assigned in real time with respect to the capture of the data representative of a user's gesture. The system may track the user during a set of short gesture calibration tests and assign the gesture dictionary based on a compilation of the data captured that represents the user's gestures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION OF ILLUSTRATIVE EMBODIMENTS

Figure 1:
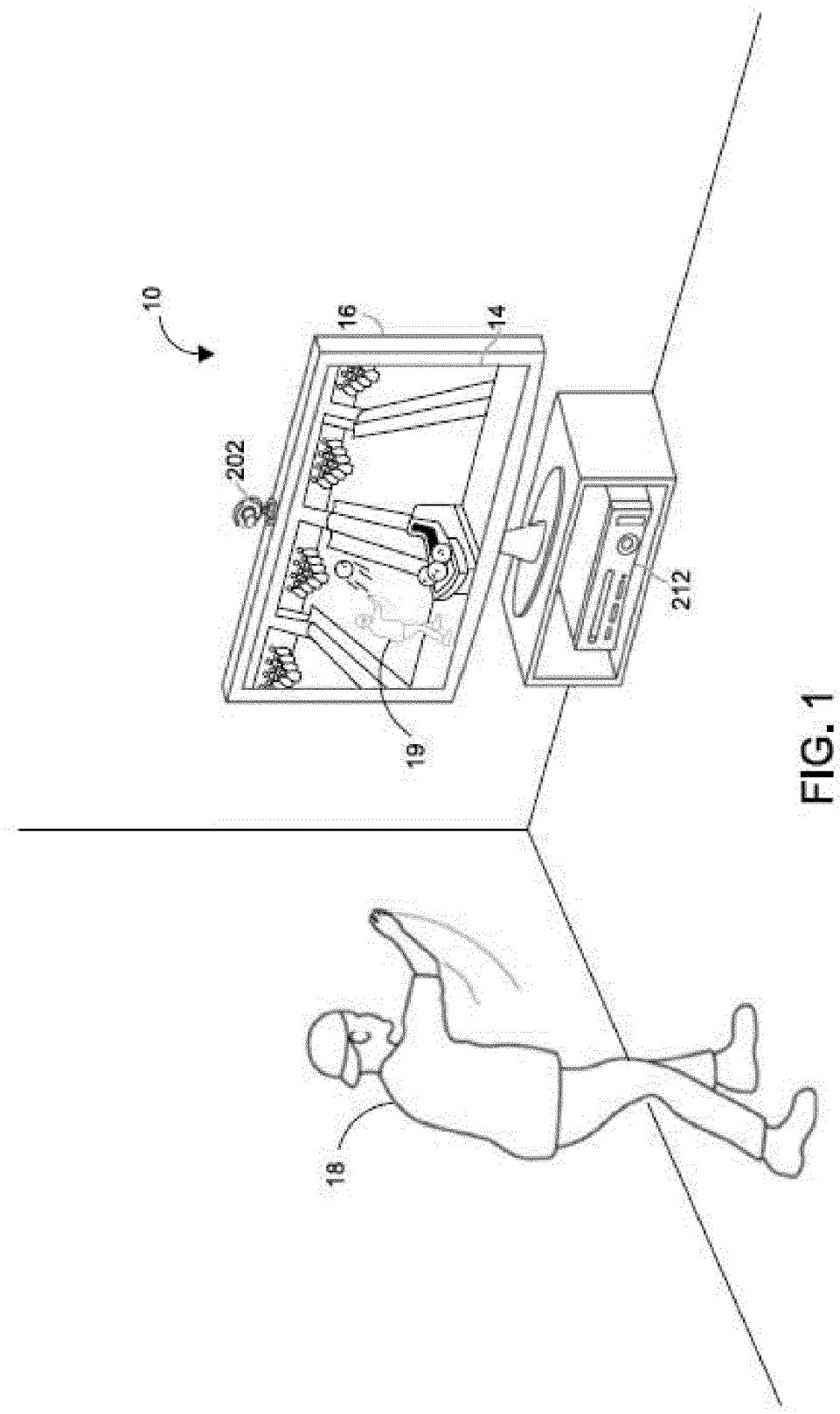
FIG. 1 illustrates an example embodiment of a target recognition, analysis, and tracking system with a user playing a game.

Disclosed herein are techniques for assigning a gesture dictionary in a gesture-based system to a user, where the gesture dictionary corresponds to captured data representative of the user's gestures. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

Embodiments are related to techniques for assigning one or more gesture dictionaries to a user based on an analysis of one more of the user's gestures. A gesture may be derived from a user's position or motion in the physical space and may include any user motion, dynamic or static, such as running, moving a finger, or a static pose. According to an example embodiment, a capture device, such as a camera, may capture data, such as image data, that is representative of the user's gesture(s). A computer environment may be used to recognize and analyze the gestures made by the user in the user's three-dimensional physical space such that the user's gestures may be interpreted to control aspects of a system or application space. The computer environment may display user feedback by mapping the user's gesture(s) to an avatar on a screen.

A gesture-based system or application may have default gesture information for determining if a user is performing a particular gesture. For example, a system may have a gesture recognizer that compares captured data to a database of default gesture information such as filters with default gesture parameters. The gesture recognizer may compare data received by the capture device to the default gesture information and output a gesture. The output may include a confidence level that the output gesture was performed.

A gesture-based system may employ techniques for selecting a gesture dictionary for a user that is tailored to the manner in which the user performs various gestures. The default gesture data may comprise a plurality of gesture dictionaries that are arranged in a hierarchical manner. A parent gesture set may be further defined by child dictionaries and the child dictionaries may be further defined by child dictionaries. Some gesture sets in a family of gesture dictionaries ordered in a hierarchical manner may define the same gestures in different manners, where a particular gesture set may be a closer fit to the user's performed gestures than another gesture set.

The system, methods, techniques, and components of assigning gesture dictionaries may be embodied in a multimedia console, such as a gaming console, or in any other computing environment in which it is desired to display a visual representation of a target, including, by way of example and without any intended limitation, satellite receivers, set top boxes, arcade games, personal computers (PCs), portable telephones, personal digital assistants (PDAs), and other hand-held devices.

FIG. 1 illustrates an example embodiment of a configuration of a target recognition, analysis, and tracking gesture-based system 10 that may employ the disclosed techniques for gesture personalization and gesture profile roaming. In the example embodiment, a user 18 is playing a bowling game. In an example embodiment, the system 10 may recognize, analyze, and/or track a human target such as the user 18. The system 10 may gather information related to the user's motions, facial expressions, body language, emotions, etc, in the physical space. For example, the system may identify and scan the human target 18. The system 10 may use body posture recognition techniques to identify the body type of the human target 18. The system 10 may identify the body parts of the user 18 and how they move.

As shown in FIG. 1, the target recognition, analysis, and tracking system 10 may include a computing environment 212. The computing environment 212 may be a multimedia console, a personal computer (PC), a cellular device, a gaming system or console, a handheld computing device, a PDA, a music player, a cloud computer, a capture device, or the like. According to an example embodiment, the computing environment 212 may include hardware components and/or software components such that the computing environment 212 may be used to execute applications. An application may be any program that operates or is executed by the computing environment including both gaming and non-gaming applications, such as a word processor, spreadsheet, media player, database application, computer game, video game, chat, forum, community, instant messaging, or the like.

As shown in FIG. 1, the target recognition, analysis, and tracking system 10 may include a capture device 202. The capture device 202 may be, for example, a camera that may be used to visually monitor one or more users, such as the user 18, such that gestures performed by the one or more users may be captured, analyzed, and tracked to perform one or more controls or actions within an application. In the example embodiment shown in FIG. 1, a virtual object is a bowling ball and the user moves in the three-dimensional physical space as if actually handling the bowling ball. The user's gestures in the physical space can control the bowling ball displayed on the screen 14. In example embodiments, the human target such as the user 18 may actually have a physical object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 212 may include a video adapter such as a graphics card and/or an audio adapter such as a sound card that may provide audiovisual signals associated with the game application, non-game application, or the like. The audiovisual device 16 may receive the audiovisual signals from the computing environment 212 and may then output the game or application visuals and/or audio associated with the audiovisual signals to the user 18. According to one embodiment, the audiovisual device 16 may be connected to the computing environment 212 via, for example, an S-Video cable, a coaxial cable, an HDMI cable, a DVI cable, a VGA cable, or the like.

As used herein, a computing environment may refer to a single computing device or to a computing system. The computing environment may include non-computing components. As used herein, a computing system, computing device, computing environment, computer, processor, or other computing component may be used interchangeably. For example, the computing environment may comprise the entire target recognition, analysis, and tracking system 10 shown in FIG. 1. The computing environment may include the audiovisual device 16 and/or the capture device 202. Either or both of the exemplary audiovisual device 16 or capture device 202 may be an entity separate but coupled to the computing environment or may be part of the computing device that processes and displays, for example. Thus, computing environment may be a standalone capture device comprising a processor that can process the captured data.

As shown in FIG. 1, the target recognition, analysis, and tracking system 10 may be used to recognize, analyze, and/or track a human target such as the user 18. For example, the user 18 may be tracked using the capture device 202 such that the gestures of user 18 may be interpreted as controls that may be used to affect the application being executed by computer environment 212. Thus, according to one embodiment, the user 18 may move his or her body to control the application. The system 10 may track the user's body and the motions made by the user's body, including gestures that control aspects of the system, such as the application, operating system, or the like.

The system 10 may translate an input to a capture device 202 into an animation, the input being representative of a user's motion, such that the animation is driven by that input. Thus, the user's motions may map to a visual representation, such as an avatar, such that the user's motions in the physical space are emulated by the avatar. The rate that frames of image data are captured and displayed may determine the level of continuity of the displayed motion of the visual representation.

FIG. 1 depicts an example embodiment of an application executing on the computing environment 212 that may be a bowling game that the user 18 may be playing. In this example, the computing environment 212 may use the audiovisual device 16 to provide a visual representation of a bowling alley and bowling lanes to the user 18. The computing environment 212 may also use the audiovisual device 16 to provide a visual representation of a player avatar 19 that the user 18 may control with his or her movements. The computer environment 212 and the capture device 202 of the target recognition, analysis, and tracking system 10 may be used to recognize and analyze the gestures made by the user 18 in the user's three-dimensional physical space such that the user's gestures may be interpreted to control the player avatar 19 in game space. For example, as shown in FIG. 1, the user 18 may make a bowling motion in a physical space to cause the player avatar 19 to make a bowling motion in the game space. Other movements by the user 18 may also be interpreted as controls or actions, such as controls to walk, select a ball, position the avatar on the bowling lane, swing the ball, etc.

Multiple users can interact with each other from remote locations. The computing environment 212 may use the audiovisual device 16 to provide the visual representation of an avatar that another user may control with his or her movements. For example, the visual representation of another bowler displayed on the audiovisual device 16 may be representative of another user, such as a second user in the physical space with the user, or a networked user in a second physical space. Similarly, an avatar may be displayed in non-gaming applications, such as a word processing or spreadsheet document. Avatars may be displayed that represent respective users that are remote to each other.

Gestures may be used in a video-game-specific context such as the bowling game example shown in FIG. 1. In another game example such as a driving game, various motions of the hands and feet may correspond to steering a vehicle in a direction, shifting gears, accelerating, and breaking. The player's gestures may be interpreted as controls that correspond to actions other than controlling the avatar 19, such as gestures used for input in a general computing context. For instance, various motions of the user's 18 hands or other body parts may to end, pause, or save a game, select a level, view high scores, communicate with a friend, etc.

While FIG. 1 depicts the user in a video-game-specific context, it is contemplated that the target recognition, analysis, and tracking system 10 may interpret target movements for controlling aspects of an operating system and/or application that are outside the realm of games. Virtually any controllable aspect of an operating system and/or application may be controlled by movements of the target such as the user 18. For example, the user's gestures may correspond to common system wide tasks such as navigate up or down in a hierarchical list, open a file, close a file, and save a file. The user's gesture may be controls applicable to an operating system, non-gaming aspects of a game, or a non-gaming application. For example, the user's gestures may be interpreted as object manipulation, such as controlling a user interface. For example, consider a user interface having blades or a tabbed interface lined up vertically left to right, where the selection of each blade or tab opens up the options for various controls within the application or the system. The system may identify the user's hand gesture for movement of a tab, where the user's hand in the physical space is virtually aligned with a tab in the application space. The gesture, including a pause, a grabbing motion, and then a sweep of the hand to the left, may be interpreted as the selection of a tab, and then moving it out of the way to open the next tab.

Figure 2:
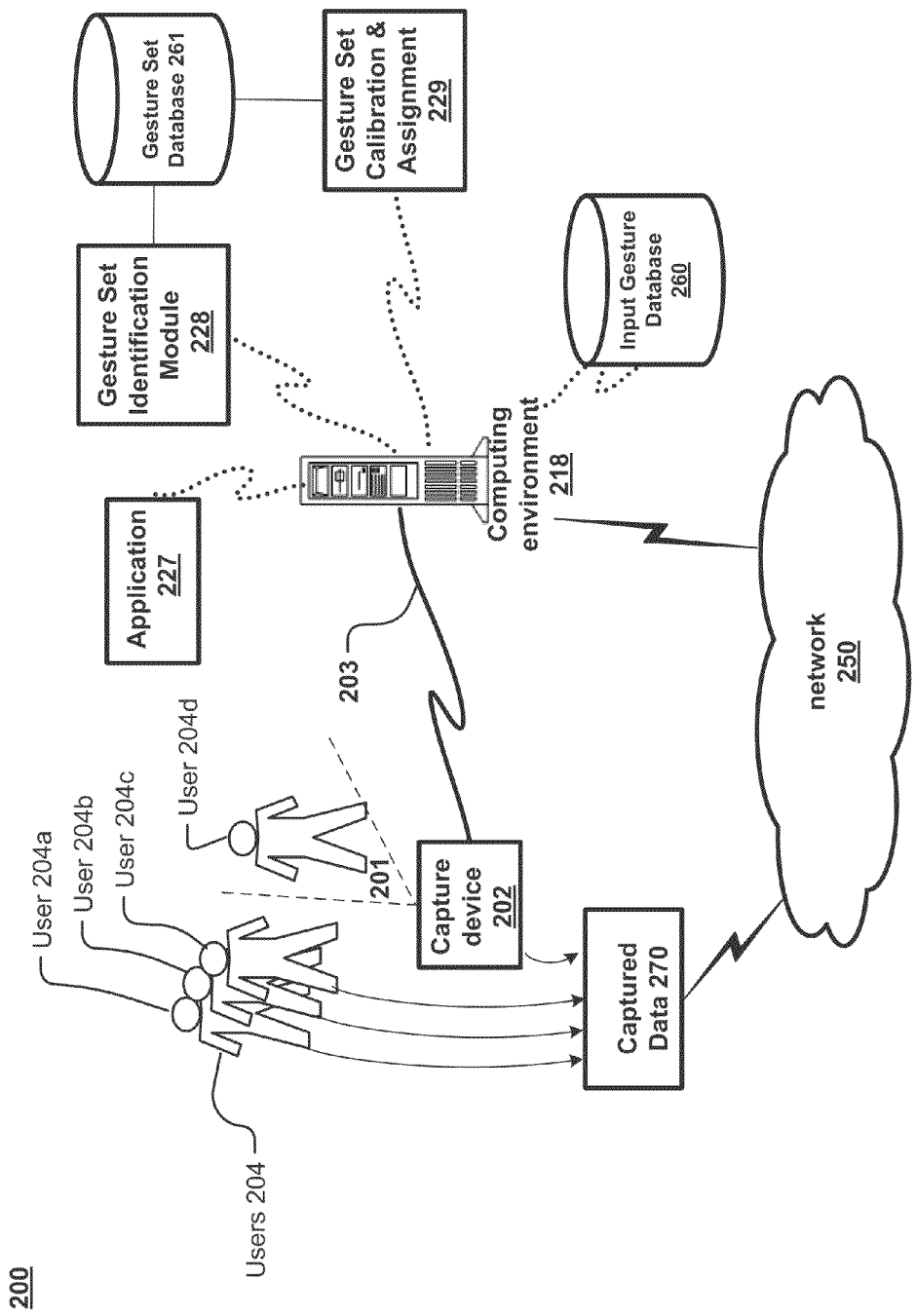
FIG. 2 illustrates an example embodiment of a gesture based system that may calibrate gesture tests and assign a gesture dictionary to a user.

FIG. 2 illustrates an example system 200 that may implement techniques for determining the gesture dictionary that applies. System 200 may include a computing environment 218. A computing environment may be a multimedia console, a personal computer (PC), a gaming system or console, a handheld computing device, a PDA, a mobile phone, a cloud computer, or the like. For example, the computing environment 218 may be a dedicated video game console, a central server or platform that hosts a plurality of clients, or a personal computing device, such as a cellular telephone or a personal computer. The computing environment 218 may comprise or otherwise be coupled to a capture device for receiving and processing data representative of a user and a user's gestures in a physical space. For example, capture device 202, associated with user 204*d*, may capture data 270 representative of user 204*d* in the user's 204*d* physical space 201. The capture device itself or another computing environment, such as computing environment 218, that receives the captured data may employ gesture recognition techniques to identify gestures from the captured data 270.

The users in this example are users 204*a*, 204*b*, 204*c*, and 204*d*, collectively users 204, but it is contemplated that any number of users may interact with the gesture-based system 200. For exemplary purposes, users 204*a*, 204*b*, and 204*c* in this example are remote to the computing environment 218, user 204*d* is local to computing environment 218. One or more capture devices may be respectively associated with each of the users 204 and capture data that is representative of each user in the user's respective physical space, with capture device 202 representing an example of such capture device. The capture device may be a depth camera or a plurality of cameras, for example, that communicates with a single computing environment or with a plurality of computing environments. The captured data 270 represents captured data captured separately for each of the users 204 or an aggregation of captured data captured for any combination of users.

In this example, the computing environment 218 receives and processes captured data 270, either remotely or locally, that represents each of users 204*a*, 204*b*, 204*c*, and 204*d* for gesture recognition. The computing environment 218 may store the captured data in an input gesture database 260. The computing environment 218 may process the captured data and identify the input gesture data, storing information about the input gesture data from the captured data in the input gesture database 260. For example, capture device 202 may provide the captured data 270 to the computing environment 218 via a network 250 or, if the capture device 202 shares a local environment with computing environment 218, via either the network 250 and/or a direct connection 203. The captured data 270 associated with remote users 204*a*, 204*b*, and 204*c* may be captured by a remote capture device and provided to the computing environment 218 via the network 250.

As described, the capture device, such as capture device 202, and computing environment 218 that may communicate with other system components via a network 250. A network 250 may include, for example, an intranet, an internet, the Internet, a personal area network (PAN), a campus area network (CAN), a local area network (LAN), a wide area network (WAN), a computer network, a gaming network, or the like. The network 250 may also represent the technology that connects individual devices in the network, such as optical fibre, a public switched telephone network (PSTN), a cellular telephone network, a global Telex network, wireless LAN, Ethernet, power line communications, or the like. Computing environments may be connected together by wired or wireless systems, by local networks or widely distributed networks. Any appropriate wireless interface can be utilized for network communications. For example, the wireless link can be in accordance with the following protocols: GSM, CDMA, UMTS, LTE, WIMAX, WIFI, ZIGBEE, or a combination thereof. A network may include cloud or cloud computing. A cloud infrastructure, for example, may include a multitude of services delivered through data centers and built on servers. The services may be accessible anywhere that provides access to the networking infrastructure. The cloud may appear to be a single point of access to the user and the infrastructure may not be visible to a client.

In this example, computing environment 218 is shown executing application 227. An application 227 may be any program that operates or is executed by the computing environment including both gaming and non-gaming applications, such as a word processor, spreadsheet, media player, database application, computer game, video game, chat, forum, community, instant messaging, or the like.

Figure 3A:
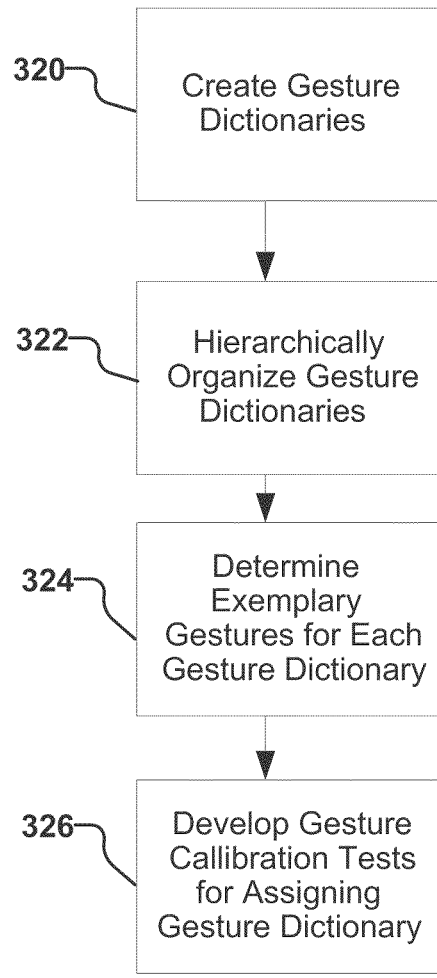
FIG. 3A depicts an example flow diagram for a developing gesture dictionaries and developing gesture calibration tests

The computing environment may comprise modules for processing gesture data to develop gesture sets and identify calibration tests for matching a gesture dictionary to a user. For example, the computing environment 218 may comprise a gesture set identification module 228 the develops gesture sets and identifies tests for assigning a gesture dictionary. FIG. 3A depicts an example flow diagram for developing gesture sets and identifying calibration tests that may be performed by the gesture set identification module 228. The system may create gesture sets or dictionaries at 302. A gesture, either alone or in combination with other exemplary gestures, uniquely identifies a gesture dictionary. As described in more detail below, the gesture dictionaries may be hierarchically organized at 322. The system may select exemplary gestures for each gesture dictionary at 324 to be used in gesture calibration tests at 326. For example, the system may select a "jump" gesture or a "open file" gesture from one or more gesture dictionaries. As described in more detail below, the system may use a selected exemplary gesture for gesture calibration tests for assigning a gesture dictionary to a user at 326.

With respect to the organization of the dictionaries developed, where there may be any number of dictionaries developed, these dictionaries may be hierarchically organized. Referring to the example shown in FIG. 3B, for example, there may be a Dictionary A 302 and a Dictionary B, each of which corresponds to a fundamentally different gesture set. Each of these dictionaries may have a family of related dictionaries that represent additional gestures or more specific gestures. For example, the Dictionary A 302 family may have a parent dictionary, Dictionary A, and Dictionary A 302 may have a child gesture set A.1.c 306c Parent Dictionary A 302 may comprise gestures that are applicable to a scenario and a child gesture set may comprise gestures that either supplement or modify the gestures in parent Dictionary A. For example, parent Dictionary A 302 may comprise gestures that are applicable system-wide and a child gesture set may comprise gestures that are also applicable system-wide but either supplement to or modify the gestures in Dictionary A.

If a dictionary is hierarchically organized, the gesture dictionary may be unique with respect to peer dictionaries at the same hierarchical depth. Thus, more than one dictionary may share the same parent dictionary, but at the child level, the children dictionaries may be unique with respect to each other. For example, in the example above, Dictionary A.1 may have a gesture for zooming in that involves two arms that start separated and then come together such that the hands meet, whereas Dictionary B.1 304a may have a gesture for zooming in that involves two fingers pinching.

A family of related dictionaries may comprise any number of child dictionaries and child dictionaries of those child dictionaries, etc. For example, Dictionary A 302 has a child Dictionary A.1, and Dictionary A.1 has children dictionaries A.1.c 306ca 306a, A.1.c 306cb 306b, and A.1.c 306cc. Each dictionary may apply in a particular situation, or a combination of dictionaries may be applicable. For example, Dictionary A 302 may represent the parent of a family of large limb gestures, Dictionary A.1 303a may comprise gestures for large gestures comprising arm motion and Dictionary A.2 303b may comprise gestures for large gestures comprising leg motion. Some gestures may overlap with both Dictionary A.1 303a and Dictionary A.2 303b, such as gestures comprising both arm and leg motions. Within Dictionary A.1, specific arm gestures may be defined by Dictionary A.1a, A.1b, and A.1c. The particular cluster of dictionaries that are assigned to a user, therefore, may be tailored to identifiers that associate with the user. The number of identifiers may correspond to a more tailored cluster of dictionaries.

An identifier associated with each dictionary may further narrow the application of the dictionary. For example, consider the Dictionary B 304 family. Dictionary B 304 may represent the gesture dictionaries that apply in a particular gaming application. Dictionary B 304 comprises four dictionary children, B.1 304a, B.2 304b, B.3 304c, B.4 304d. Each of these may comprise gestures for the gaming application, and the identifier may further define when each child dictionary applies. For example, the identifier x associated with Dictionary B.1 304a may identify that the gesture Dictionary B.1 304a applies for left handed users; identifier y associated with Dictionary B.4 may associated the dictionary with right handed users, and identifier z associated with Dictionary B.3 304c may associate the dictionary with a particular location (e.g., a certain country or state). As described in more detail with respect to FIG. 3D, dictionaries may overlap or share gestures. For example, Dictionary B.3 may comprise gestures applicable to a particular country, but may have gestures that also apply to right handed users. Thus, Dictionary B.3 and Dictionary B.4 may have overlapping gestures.

The options for the gesture dictionary or combination of gesture dictionaries that apply enables the system to more intuitively and effectively recognize gestures for a particular mental model of a user. As described in more detail below, an identifier may be associated with each gesture dictionary, where the identifier is indicative of a feature of the environment or the user that identifies when the dictionary applies. Thus, the system may use the identifier to assist in assigning a gesture dictionary to a user.

Referring back to FIG. 2, the computing environment may store the generated dictionaries of gesture data and any identifiers of each gesture and/or relationship between gestures in the gesture set database 261. For example, the sets of gesture data may be stored as a structured collection of records and/or data associated with the sets of gesture data identified and/or modified by the input gesture database 260 and the gesture set database 261. The information in the gesture dictionary database 261 may be structured to enable a person or program to extract desired information to share information about the user. While described as a database, it is contemplated that the gesture dictionary database 261 may take any form of data storage, including a storage module, device, or memory, for example. The gesture dictionary database 261 may be provided as a database management system, an object-oriented database management system, a relational database management system (e.g. DB2, Access, etc), a file system, or another conventional database package. Further, the database 261 can be accessed via a Structure Query Language (SQL), or other tools known to one of ordinary skill in the art.

The gesture set database 261 may include dictionaries of standard gesture data available for incorporating into the gesture-based system. Gesture data or sets of gesture data used for gesture recognition is also referred to herein as gesture recognition data, where the terms gesture data, gesture set, and gesture recognition data may be used interchangeably. The gesture recognition data may serve as a dictionary that enables the translation of a user's gestures detected by a capture device into an action to be executed by any computing device to control an aspect of the gesture-based system.

It is noted that gestures may include dynamic or static movement as well as voice commands, and may be performed to control aspects of the system or an executing application. A gesture may also comprise input derived from the combination of user position or movement captured by a capture device (herein "user position data" or "position data") in conjunction with input derived from another source, such as the press of a button on a controller, or the position of an object in a scene in which the user is captured (herein "additional data"). The system may receive controller input from a wired or wireless controller. The user may supplement the motions or poses that he makes with his body that are captured by capture device 202 with input via the buttons, joysticks or other pads of a controller. For instance, while playing a first-person shooter game, user 204*d* may point with his arm at a location displayed by the computing environment 218. He may further press a button on controller at substantially the same time. Computing device 212 may recognize the user pointing while pressing a button as a "discharge firearm" gesture.

Thus, a computing environment may not only include a gesture interface but may process instructions configured to use tactile based (input relying on touch) user input. For example, application 227 may comprise such instructions, where application 227 may be any type of program such as operating system, word processor, videogame, etc. In an embodiment where application 227 is an operating system, the operating system can include input output drivers such as mouse drivers, keyboard drivers, a capture device driver, and other I/O drivers such as, for example, touch screen drivers, microphone drivers, videogame controller drivers, or any other human interface device drivers. In an embodiment where application 227 is an application such as a web-browser, a word processor, a picture editing program, etc, application 227 can include executable instructions that request one or more threads to handle and process user input. In this example, application 227 may rely on mouse drivers, keyboard drivers, and other I/O drivers installed on the operating system and OS code to supply it with user interface messages.

Packages of standard gesture recognition data may be available for incorporating into the gesture-based system. Enabling dictionaries of standard gestures allows application developers to employ gesture recognition techniques into their applications during development based on a standard set for commonality. A gesture set database 261 may comprise a plurality of gesture recognition data. Where gestures are complementary with each other, the gesture data may be grouped into gesture sets, such as into the family of dictionaries depicted in FIG. 3B. These gesture sets may be provided to applications for use by a gesture recognizer engine. An application may utilize one or more gesture sets. Thus, the gestures associated with the gesture-based system, such as an application executing on a computing environment in the gesture-based system, may be determined by the gesture sets that are assigned or available in each scenario.

A gesture set (or sets), such as a default gesture set, may be provided with an application 227 or come packaged with another component of the gesture-based system, such as delivered with the computing environment 218 or incorporated into the operating system. A standardized default gesture set (or sets) may apply universally for all users. For example, a set of gestures such as Dictionary A 302 described with respect to FIG. 3B may be universally applicable across operating systems and apply system-wide such that a user may perform certain commands via gestures at any time while interacting with the system, despite variations in the system (such as a different application executing on the system).

As described herein, input gesture data may be analyzed to assign a dictionary that enables the translation of input gesture data comprising gestures, detected by a capture device, into an action to be executed by the gesture-based system to control an aspect of the gesture-based system. The computing environment 218 may comprise a module for analyzing or manipulating the input gesture data received to assign a gesture dictionary to a user. For example, the computing environment 218 may comprise a gesture set calibration & assignment module 229. The gesture set calibration & assignment module 229 may analyze or manipulate the input gesture data received to identify the gesture dictionary. By observing a user for a brief time, the system can determine what gesture dictionary the system should apply. For example, the input gesture database 260 may contain an inventory of input gesture data, such as gesture data received from users interacting with the system. The computing environment may store or otherwise have access to input gesture database 260. The inventory of gesture data in the gesture database 260 may a structured collection of records and/or data associated with the gesture data captured or received by the computing environment 218. The system can analyze information from the input gesture database for a particular user to determine the gesture dictionary that applies for the particular user. As noted above, a gesture may comprise inputs such as voice commands or tactile input. Thus, a gesture dictionary that applies may be based on inputs other than those derived from a user's position or motion in the physical space. For example, a dictionary may be assigned that is associated with the way a person speaks or a particular language of the user. The dictionary assigned may be based on a combination of input types. For example, a user may tend to use voice commands and a user's motion in physical space, or a user's position in the physical space and a tactile input. The dictionary assigned may be best fit to the manner in which a user gestures.

The system may cluster users for assisting in gesture dictionary assignment. For example, the system may correlate the user's input gesture data to the input gesture data of another user, recognizing similarities between various features of the input gesture data of both users. The system may select gesture dictionaries for assignment to a user based on the dictionaries assigned to another user, where the input gesture data between users comprises similarities. Thus, the system may correlate the input gesture data to a gesture dictionary by correlating the input gesture data of a first user to an input gesture data of a second user, and assigning a gesture dictionary assigned to the second user to the first user. Consider an example of a user that is playing a driving game, and is motioning in the physical space to simulate the holding of and the motion of a steering wheel. A first user may stand upright and move his or her hands in a steady, circular motion. A second user may move their hands to the left and right without rotation. A third user may steer with both hands on the side and rotate quickly rather than making a smooth motion. The first, second, and third user may each represent the gestures performed by a plurality of users, creating a first, second, and third cluster of input gesture data types for gesturing with a steering wheel. Each cluster may be represented by an identifier and a corresponding gesture dictionary. The system may associate an identifier x with the first user's gesture related to the steering wheel, an identifier y with the second user's gestures related to the steering wheel, and identifier z with the third gesture type. When the system captures data representative of a user, the system may identify the user's motion as either closer to identifier x, y, or z, and cluster the user with the best fit cluster. Any number of users may be assigned a dictionary based on such clustering of gesture data.

The cluster of gesture data may be defined by an identifier that is broadly defined as the gesture parameters common to the cluster. In another example, a more specific identifier may be identified. For example, the third cluster described above may be common to users in a particular region or country. Thus, the identifier may be defined by the location rather than the gesture data. Thus, a user that enters into the gesture-based system may be associated with a gesture dictionary based on the user's location, as identified by the system and correlated to the appropriate identifier. Over time, the system may further assign gesture dictionaries to a user as more features of the user are identified. For example, the user may be assigned to a particular cluster of gesture recognition data for being a left-handed user. However, over time, the system may recognize that the user is left-handed, typically performs small scale gestures, and speaks in a soft tone. Thus, the gesture dictionaries assigned to the user may be tailored to those dictionaries associated with identifiers representing these traits. It may be that a particular identifier does not exist for a "soft tone," for example. The system may correlate traits of a particular user to those of another user and cluster users based on the similarities between users, thus assigning users within a cluster to the same gesture dictionaries.

Figure 3B:
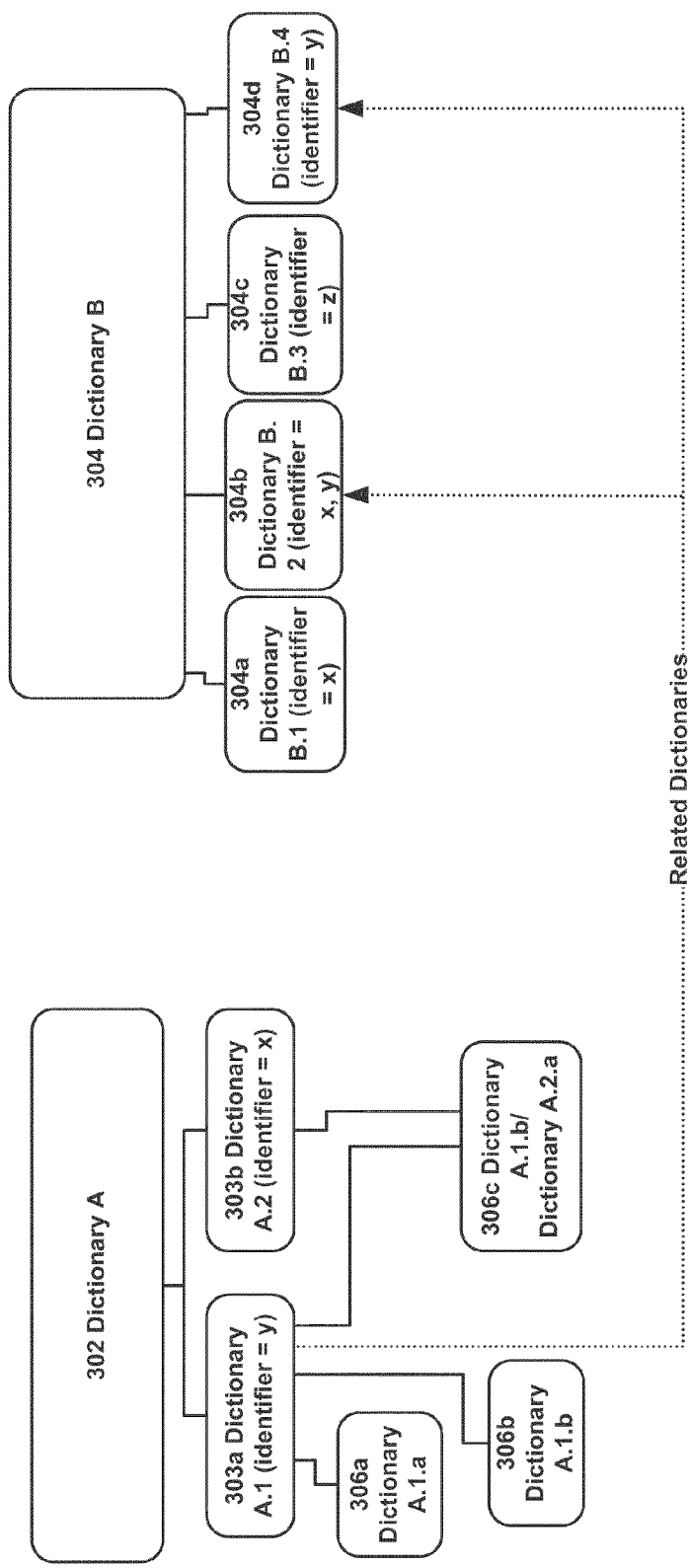
FIG. 3B depicts an example of dictionary families organized into separate hierarchies of parent and child dictionaries.

An identifier may be associated with a gesture dictionary. For example, gesture set identification module 228 may associate one or a combination of identifiers to a gesture set. As shown in FIG. 3B, for example, Dictionary A.1 303a is associated with identifier x. An identifier, such as identifier x, may be any feature of the scenario that is identifiable by the system. The gesture set identification module 228 may associate the identifier with a gesture dictionary during generation of the dictionary, and the identifier may change as a gesture dictionary evolves.

An identifier associated with a gesture dictionary may assist to identify the applicability of a gesture set for gesture recognition. Consider if a dictionary is associated with an identifier where the identifier is a location. The system may identify a location via GPS or via an IP address, where a location may be an identifier. The system may identify a user may by capturing data representative of the user and employing body/facial recognition techniques, where a particular user or detected features of a user may be an identifier. The system may identify the operating system or an application loaded by an analysis of the hardware/software configuration, such as by identifying the serial numbers of components labeled during installation, where an operating system or an application may be an identifier.

In another example, the identifier associated with a dictionary may define a specific user, a type of user, or a feature of a user (e.g., geographically, demographically, linguistically, culturally, etc.). The system may track users, identify a user or group of users, or identify features of a user, and if the system identifies a correlation of the scenario to the identifier, the gesture dictionary associated with the identifier may be assigned.

In yet another example, the identifier may correspond to the basis for the needed updates. For example, a particular cultural context may be the reason why a certain gesture fails for a group of users (e.g., a gesture for powering the system off that comprises a waving gesture, where a waving gesture may be a derogatory motion within a particular cultural context). The common feature of the users to which an evolved gesture set may apply, that does not use a waving gesture, may be a particular culture—the cause of the need for evolving the gesture data.

While the above examples provide specific examples for an identifier, it is noted that the identifier may be any system-identifiable feature of the scenario. For example, the identifier may be at least one of an operating system, an application, a user, a feature of a user, a location, a type of application, a hardware configuration, a software configuration, a culture, current user, geography, demography, linguistic, culture, or a style. The system may correlate a scenario to the identifier by analyzing captured data (e.g., identifying a user from the captured data or identifying a culture based on a user's gestures), or via other inputs by a user or a component in the system (e.g., the user may indicate a location by selecting a location from a menu, or the system may provide details of an existing hardware configuration, a location device may provide a location, etc). Upon recognition of the identifier, the system may select the gesture set that is associated with the identifier and implement the gesture set for gesture recognition.

Figure 3C:
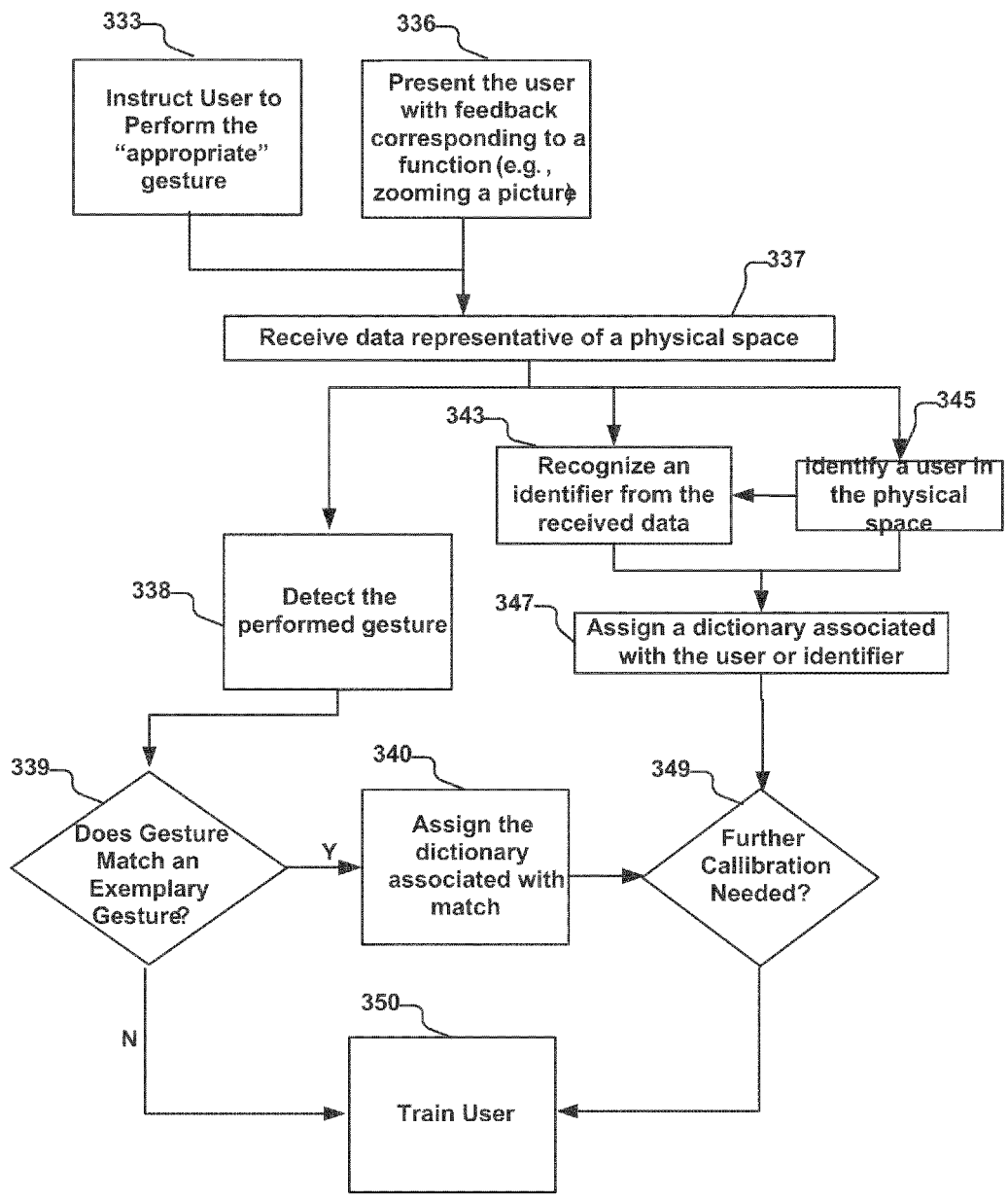
FIG. 3C depicts an example flow diagram for assigning or reassigning a gesture dictionary to a user and calibrating the dictionary if necessary.

FIG. 3C depicts an example flow diagram for a method of assigning a gesture dictionary. In an example, the system may use calibration tests defined by the gesture identification module 228 for matching a user with a gesture dictionary. In another example, the gesture-based system may recognize a failure of a user to satisfy gesture data in an assigned dictionary, thereby resulting in a failure to issue a control or commend to the system via the gesture. The recognition of a level of failure may result in an assignment or a reassignment of a gesture dictionary. For example, a default gesture dictionary may be assigned as part of calibration and the system may recognize child dictionaries that should be assigned that may be appropriate to supplement the default dictionary.

The system may track the user explicitly or passively for assigning a gesture dictionary. For example, the system may request that the user perform a series of gestures. The system may recognize the failure based on explicitly requested feedback, such as by requesting a user to perform a gesture and comparing the captured gesture data to the stored gesture data. In an example embodiment, the system may perform a gesture calibration by presenting the user with feedback indicative of a received instruction and ask the user to perform the corresponding gesture. A calibration procedure may take place upon initialization of the system, an application, or when a new user is identified. From the captured data, the system can identify the effectiveness of the gestures and how well the user performs each in light of the stored gesture data.

The system may also recognize the failure through passive tracking of the user, where the user may or may not know the system is capturing gesture data for purposes of analyzing of the effectiveness of the stored gesture data. While the user is interacting with the system, the system may track gestures performed by the user for the purpose of analyzing the effectiveness of the gesture data. In an example, the system may expect a particular gesture but fail to recognize the gesture from the user's gesture data. For example, if a user is interacting with a baseball game application or a word processing document, the system may expect a particular gesture based on the circumstances, such as a hitting gesture when the user's player is at bat in the baseball game application or a save gesture when the user closes a word processing document.

FIG. 3C illustrates examples of instructions given to a user at 333 and 336. For example, at 333 the system may provide an instruction such as "run in place" or "wave good-bye." The extent of instructions may range from very specific to very broad. For example, the instructions given by the system at 333 may be broad such as an audio command to perform a zoom operation (e.g., "demonstrate an action that corresponds to a zoom function") without a display or specific example demonstrated. The user may respond by performing an appropriate gesture that corresponds to the visual command. The instructions may be even more specific, such as, for example, at 336 the system may display a picture, demonstrate a zoom operation on the picture, and then request the user to perform the preferred gesture that will result in the same zoom operation. The user may motion or pose in a manner that is intuitive or preferred by the user to result in a zoom operation such as the one demonstrated by the system. The user may use any motion or pose desired for that user.

Alternatively, the system may initiate the gesture assignment process by gathering information about a user's gesture without requesting explicit input by the user. For example, at 337, when the system receives data representative of a physical space, with or without the instructions given by the system such as at 333 or 336, the system may identify a user's gestures from the received data. With passive recognition, the system may perform gesture dictionary assignment without requesting explicit input from the user. Thus, the system may recognize gestures at 338 via explicit or passive data capture.

The system may manipulate the circumstances of the gesture-based system such that the natural action for the user includes the training data the system is looking to collect. The manipulation of an output of the gesture-based system to the user can be monitored and used to elicit a particular gesture, where the system can compile the resulting input gesture data. For example, the system may be compiling information for a user's gesture related to fighting in a game application. To solicit a particular gesture, during game play a single monster might appear in isolation—by context of the game play the appearance of the monster may prompt the user to perform a specific gesture to eradicate the monster, such as a gesture for poking the monster in the eyes. In another example, the system may be compiling information for platform gestures, such as powering on a component of the system. The system may cause a component to power down and then track the user, compiling input gesture data to evaluate the user's gesture for powering the component on. Thus, the system can elicit certain gestures from the user by manipulating certain circumstances.

At 343, the system may recognize an identifier based on the identity of the user or an identifier otherwise recognized from the received data (e.g., an operating system, a system location, a user location, an application, etc). At 345, the system may identify a user in the physical space such as, for example, reading a user profile or analyzing the captured data to identify the user. At 347, the system may assign a dictionary at 347 to the user based on the identifier or identity of the user.

If explicit instructions are provided to the user, such as the example instructions at 333 or 336, the system may capture data representative of the user's gesture at 337 and detect the performed gesture at 338. The system may record the gesture information to define the parameters for the user's gesture, such as for a user's zoom operation. At 339, the system may evaluate whether the user's gesture matches a gesture from a dictionary, such as an exemplary gesture selected for purposes of calibration (as described above). If so, the system may assign the dictionary or related dictionaries to the user that includes the gesture that corresponds to the user's performed gesture. The gesture dictionary assigned may be based on how the user performed the gesture. The gesture recognition data to be implemented for that gesture thereafter may therefore correspond to the captured data.

The system may assign to a user an entire family of dictionaries, a subset of a family of dictionaries, or one dictionary within a family, and may assign to the user dictionaries from multiple families for gesture recognition when the circumstances are appropriate. For example, with respect to the organization of dictionaries shown in FIG. 3B, the system may recognize that the user's gestures correspond to those in Dictionaries A and A.1, but not to any of the children dictionaries of A.1, and also recognize that the user's gestures correspond to a dictionary in the dictionary B 304 family.

Assume for purposes of an example that the Dictionary A 302 family depicted in FIG. 3B comprises gestures that are applicable system-wide and the Dictionary B 304 family may represent gesture sets that are application-specific. Dictionary A 302 and B 304 may be related in that an application corresponding to at least one of the gesture sets in the Dictionary B 304 family executes on the operating system associated with the Dictionary B 304 family. In another example, Dictionary A 302 and B 304 may be distinct dictionary families that are not related. For example, both Dictionary A 302 and B 304 may both apply system-wide, but the gesture sets may apply in distinct scenarios or at distinct times based on the scale of the gestures. For example, Dictionary A 302 may represent a set of gestures that involve large movements of a user's limbs. Dictionary A.1 303a may be related to Dictionary A 302 in that Dictionary A.1 303a involves large movements of the arms whereas Dictionary A.2 303b involves large movements of the legs. Dictionary A.1 303a.a, A.1 303a.b, and A.1 303a.c may be different gestures that make use of the arms and Dictionary A.2 303b.a and A.2 303b.b may comprise gestures that make use of the user's legs. Dictionary B 304 may represent a set of gestures that involve primarily finger motions, such as pinching and pointing. Dictionary B.1 304a may involve a set of gestures that assigns different meaning based on the number of fingers a user extends for a particular gesture. As the example demonstrates, the sub-dictionaries may be a more specific definition for the gestures and/or additional gestures that are defined more specifically than those in the parent dictionary.

An identifier may assist in gesture dictionary assignment or reassignment. For example, an identifier may be associated with a gesture dictionary, either during development or as a result of adaptations made to the dictionary. In the former example, a developer may designate identifiers during development. For example, the developer may recognize a difference in gestures between cultures, and a dictionary may correspond to each culture where the identifier is the indication of the culture associated with a particular dictionary. In the latter example, where the identifier may be associated with a dictionary that has been modified, some systems and/or applications are adapted to modify the definitions of gesture data based on a number of reasons. For example, the system may recognize that a user has a specific method for performing a gesture, or the system may aggregate gesture data from multiple users and refine the gesture data to correspond to gesture data actually captured from users.

The identifier may be associated with an exemplary gesture selected for calibration purposes. For example, during development an exemplary gesture may be selected for use in assigning gesture dictionaries. The system may request that a user perform the exemplary gesture (or gestures), and compare the received data representative of the user's gestures to the exemplary gesture data. The results may assist in the determination of gesture dictionary assignment by comparing the input gesture data to gesture recognition data available for the gesture. For example, the exemplary gesture may be a jump gesture. The system may track the user as the user performs a "jump" gesture and determine the agility of the user, the size of the user, the height of the user, or the energy of the user. The system may assign a gesture dictionary based on these traits. For example, if the user does not move very quickly and does not jump very high, the system may assign a dictionary that represents gestures comprising less movement. However, if the user jumps and is very active, as identified by the system from the gesture data, the system may assign a dictionary that represents the same gestures but yet, with more movement involved.

In another example, the system may request that the user perform a point and select gesture. The system may prompt the user to perform the motion, pose, or give a verbal command that he or she associates with "point and select." The system may not only compare the gesture data with the available gesture dictionaries to determine which, if any, represents gesture data similar to the received data representative of the user, but the system may determine other qualities of the user, such as handedness, or gender. The system may use the information to assign the dictionary that best corresponds to the user.

When the identifier corresponds to the circumstances of a particular scenario, the gesture set may be implemented. In this example, child dictionary A.1 303a is associated with identifier x. The identifier x may be any number of identifying features for identifying the scenario or a group of users to which a gesture set applies. Initially and/or over time, the system may recognize circumstances of the scenario that correlate to an identifier associated with a gesture dictionary, whether it is a recognition of a specific user, or a circumstance of the environment, such as an operating system, etc. For example, over time the system may recognize that a user is left-handed and assign or reassign dictionaries based on this recognition. In another example, the system may recognize the switch to a new application and assign a dictionary to a user based on an entirely different set of gestures.

The identifier may broadly associate the gesture set to a type of operating system or application or the identifier may be more specific such as a particular user or a specific component used in the system. For example, an identifier may be based on a feature of a user. User data may have formed a basis for defining gesture recognition in a gesture dictionary during development. The identifier may be a common feature among the users from which gesture data was initially generated. The system may recognize the presence of a circumstance that correlates to an identifier and assign the gesture dictionary associated with the identifier. For example, the identifier may be a handedness of the user, such as right-handed or left-handed. When the user's handedness is recognized by the system, the system may assign the dictionary to the user that is associated with the user's handedness.

The identifier may be a circumstance of the environment, such as a location. Then, the system may recognize that a user is interacting with the system from within the location and assign the corresponding gesture dictionary. The gesture-based system may identify the country based on an identity of the location of the system or the user. For example, the gesture-based system may be programmed with location-based system software that can utilize location-based services (e.g., GPS) to determine the location of the components. In another example embodiment, the system identifies an IP address associated with the user's computing environment and uses the IP address to determine the location of the user. In another example, the user may select a country and the gesture-based system may store the user's selection in memory.

The system can access a user profile or track the user to identify features of the user, such as a user's skill level or range. The system can compare the information about the user against the identifiers associated with any number of dictionaries, and assign the gesture dictionary that corresponds to the information. For example, referring to FIG. 3B, Dictionary A 302 may correspond to a particular application. FIG. 3B depicts two example child dictionaries to Dictionary A 302, Dictionary A.1 303a and A.2 303b. Dictionary A 302 may define a general set of gestures, such as those that pertain to a particular application. Dictionary A.1 303a's child dictionaries may correspond to a particular skill level as identified by the identifier x. Thus, Dictionary A.1 303a and Dictionary A.2 303b may each correspond to a different skill level as identified by the dictionary's respective identifier, x or y. For example, identifier x may be 'beginner' and identifier y may be 'advanced.' In an example, if a user selects a 'beginner' mode upon startup of the system, the system can assign Dictionary A.1 303a and any child dictionaries of Dictionary A.1 303a that are applicable to the user based on that identifier. In another example, the user may have a user profile that indicates the user's skill level, or the system may track the user and determine, by comparing the user's input gesture data to gesture data in the gesture dictionaries, that the user's gestures correspond to a beginner skill level.

The identifier associated with a gesture set may be based on a cultural context. For example, the gesture set in Dictionary A 302 may be applicable system-wide and apply as a default when a system is powered on. The contents of the Dictionary A 302 may be pre-packaged as part of the platform that supports gestures. The gestures in Dictionary A.1 303a may supplement or modify the gestures in Dictionary A 302 to correspond to the particular culture. For example, Dictionary A.1 303a is shown associated with identifier x. The identifier x may identify a particular location or region in a country that is indicative of a cultural context. Consider an example of a "close file" gesture defined universally in Dictionary A, where Dictionary A 302 defines gestures as part of a default gesture set provided with a platform that supports gestures. The "close file" in the default gesture set in Dictionary A 302 may comprise a wave motion with one hand, corresponding intuitively to a motion that means good-bye to a group of users. However, a waving motion does not correspond intuitively to mean good-bye within certain cultures. In a first culture, for example, a waving motion may have a derogatory meaning.

Dictionary A.1 303a may be implemented upon recognition of the identifier (i.e., the cultural context) and supplement or modify the gestures in parent Dictionary A. In this example Dictionary A.1 may modify the "close file" gesture to correspond to a motion that means good-bye to the users within the region identified by identifier x, such as to a motion that makes better sense to the culture of users.

As described above, in another example embodiment, the identifier may be related to other circumstances of the gesture based system, such as the type of operating system or type of application executing during compilation of the gesture data. For example, a set of gestures may function across varying operating systems and/or applications, the identifier may assist in determining under which circumstances a particular gesture set applies. The identifier, for example, may associate a gesture set with a specific category of applications. For example, a gesture set applicable for productivity type applications may be universally applied for productivity scenarios, while another gesture set applicable for game applications may be universally applied for the game applications. Thus, each of the sets of gesture data may apply universally within respective contexts. Further, a set of gestures may be applicable based on one or any combination of identifiers. Or for example, a gesture set may be generated for a certain type of user executing a certain type of application, such as a user in a particular region gesturing to control a game application.

In another example embodiment, the identifier is a style feature, such as a style classifier. The system can classify styles of gestures (maybe some users are very precise, some are sloppy, some use more hand, some use less body, etc), and the system could compile data that correlates to the particular style, noticing that they fit one of the styles more closely than the default. It is likely that at least a subset of users within the users of the system will benefit from a gesture set evolved based on a compilation of users with a similar style. The style may be applicable to such things as a user's handwriting for generating or evolving gestures based on the handwriting of a plurality of users.

As shown by the example hierarchy of dictionaries shown in FIG. 3B, dictionaries may be distinct families or may be related in some manner. It is noted that reference to a dictionary herein contemplates a dictionary, a combination of dictionaries, a family of dictionaries such as those hierarchically organized in FIG. 3B, or any other collection of related gestures. The term dictionary, set, package, or similar term referring to the collection of related gestures is used interchangeably. Further, related gestures may be related if they are defined similarly (e.g., similar parameters). However, gestures may be related whether they have similar definitions if they are in any manner related to each other, such as applicable to the same application, operating system, or user, or if the gestures are assigned to the same user.

Figure 3D:
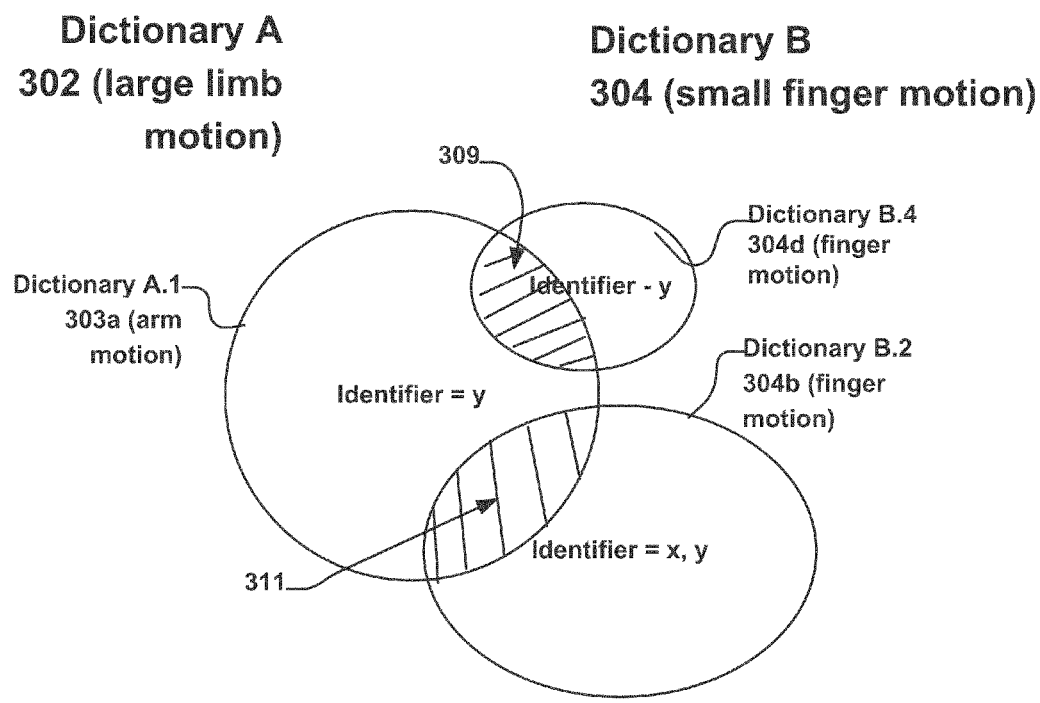
FIG. 3D depicts an example of a possible relationship that may exist between two different dictionary families.

FIG. 3D depicts an example of a possible relationship that may exist between the family of Dictionary A 302 to the family of Dictionary B. In this example, identifiers are used to indicate the relationship between the cluster of dictionaries in a family and between families of dictionaries. However, it is contemplated that any method of relating the dictionaries to each other or distinguishing them from each other is suitable.

As described in the example above, Dictionary A 302 may represent a set of gestures that involve large movements of a user's limbs. Dictionary A.1 303a (identifier=y) may be related to Dictionary A 302 in that Dictionary A.1 303a involves large movements of the arms whereas Dictionary A.2 303b (identifier=x) involves large movements of the legs. Dictionary B 304 may represent a set of gestures that involve primarily finger motions, such as pinching and pointing. Dictionary B.2 304b and B.4 304d may involve a set of gestures that assigns different meaning based on the number of fingers a user extends for a particular gesture. As the example demonstrates, the sub-dictionaries may be a more specific definition for the gestures and/or additional gestures that are defined more specifically than those in the parent dictionary.

For purposes of this example, assume that identifier y is right-handedness. Thus, Dictionary A.1 303a in the Dictionary A 302 family and Dictionary B.4 304d may be assigned to a user that is recognized or identified as favoring the right hand. Dictionary A.2 303b may represent the large arm movement gestures that are appropriate for a right handed user, and Dictionary B.4 304d may represent the default set of small finger scale gestures appropriate for a right handed user. However, Dictionary B.2 304b may represent gestures applicable to a user associated with identifier x and y. Identifier x may represent a particular location in which a cultural context applies. Thus, the gestures in Dictionary B.2 304b may represent the small finger scale gestures for a right handed user that may also be applicable within a particular cultural context. Dictionary B.4 304d may still be assigned to a user in addition to Dictionary B.3 304b, but Dictionary B.2 may modify the default gesture data in Dictionary B.4 for certain gestures.

All three dictionaries, A.1 303a, B.4 304d, and B.2 304b may be assigned to a user that is right handed and is identified as having the culture represented by y. For example, there may be some gestures that correspond to multiple identifiers and some gestures may be defined by more than one dictionary family, thereby clustering dictionaries in a unique fashion for a user or a group of users. For example, the overlap of dictionaries represented by 309 comprises both large arm motion and finger scale motion, both for a right handed user. Similarly, the overlap of dictionaries represented by 311 may comprise finger motions, large arm motions, and be specific to a particular culture. While there may be some gestures that are defined similarly between dictionaries, the specific manner in which they are clustered for assignment to a user may be unique in that the gesture dictionary or combination of dictionaries are best fit to the features associated with the user.

Referring back to FIG. 3C, at 339, if the user's gesture does not match a dictionary gesture, the system can opt to give training to the user at 350. For example, providing visual feedback representing instructional gesture data to the user can teach the user how to properly gesture to control an application. The visual feedback may be provided in any number of suitable ways. For example, visual feedback may be provided via ghosted images, player avatars, or skeletal representations. In an example embodiment, the system processes prerecorded content for displaying visual feedback. In another example embodiment, the system processes a live feed or processes live content for displaying visual feedback. The instructional gesture data may be in the form of corrected or highlighted feedback of a user's motion to show correct gestures or errors in the user's motion that corresponds to a particular gesture. The feedback can portray the deltas between the user's actual position and the ideal gesture position. The system may display feedback through augmented reality. For example, as described below, a display device 193 may provide a contact lens view or an embedded display that allows the user to see feedback overlaid on the user's natural physical environment. The display may comprise arrows or figures to trace that may be aligned relative to the user's body position or movement, and the arrows or figures may provide an example of the proper position or movement.

The system may use audio feedback, such as verbal instructions to the user that provide the user with information regarding how to improve the user's performance of a gesture. For example, the system could provide spoken cues that indicate what the user is doing incorrectly during the performance of a gesture. Similarly, the system may provide tactile feedback. For example, if the user is wearing or holding a device capable of tactile/haptic feedback, the system may provide correction information via the device. For example, a person might be wearing a pad or shirt on his arm that vibrates when the arm is outside of the desired gestural zone, or a handheld mobile device might vibrate to signal that a gesture has been done correctly.

The system may conduct a number of iterations to better understand the mental model of the user and to assign the user the dictionary that most closely corresponds to the mental model of the user (as manifested by the gestures rendered in response to performed functions).

If a dictionary is assigned at 340, either via explicit or passive assignment of the gesture dictionary, the system may identify that further calibration is needed at 349. The system may request additional inputs by the user, such as at 333 and 336, or the system may passively track the user as described above. The system may use the received data to further tailor the dictionary selections for the user based on input gestures from the user. Or, the system may provide training at 350 to teach the user to gesture more closely to the gestures as they are defined within the dictionary (or dictionaries) assigned at 340. For example, the gesture set calibration and assignment module 229 may recognize that an assigned set of gestures is not effective for certain users interacting with the system. Rather than forcing a set of gesture data to apply that is ineffective, the system may assign a different set of gesture data based on the data captured or alter the family of dictionaries that are assigned to the user. For example, Dictionary A 302 and A.1 303a may still be effective, but instead of the child dictionary A.1 303a.a, the system may reassign child dictionary A.1 303a.b.

In an example embodiment, the need for calibration at 349 may be recognized after a gesture dictionary is assigned to the user. For example, the gesture set may be assigned by default, such as the gesture set being deployed as part of an operating system or a gaming system, or assigned specifically assigned to a user. At 349, the need for further calibration may be determined by an analysis of feedback from the user by the system to determine the effectiveness of the gestures in the assigned dictionary. The gesture-based system may recognize that a particular gesture(s) is not effective in a particular scenario and reassign the dictionary that applies. For example, the system may determine effectiveness by comparing the user's gesture data to gestures defined in the assigned dictionary. A gesture may be defined by a plurality of parameters. For example, a gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder, and on the same side of the head as the throwing arm. It may not be necessary to define all bounds of a volume, such as with this throwing gesture, where an outer bound away from the body is left undefined, and the volume extends out indefinitely, or to the edge of scene that is being monitored.

As described in more detail below, a gesture recognizer engine may comprise information defining a gesture, such as parameters, or metadata, for that gesture. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Where the gesture is a throw, a parameter may be a threshold velocity that the hand has to reach, a distance the hand must travel (either absolute, or relative to the size of the user as a whole), and a confidence rating by the recognizer engine that the gesture occurred. Parameters for a gesture may vary between applications, between contexts of a single application, or within one context of one application over time.

Thus, a variation between the user's gestures and the gesture data, such as gesture parameters set in the filter for the gesture, may indicate an ineffectiveness of the stored gesture data. The result may be a complete failure in the user's gesture to register with the stored gesture data or it may result in a variation that is outside an acceptable tolerance. For example, variations between the data representative of the measured gesture and filter parameters for a gesture(s) may indicate a failure in the execution of the measured gesture. The variation can be compared to a threshold level of acceptance, where a variance amount that is below the threshold is outside the acceptable tolerance.

The system may use the failure or unacceptable variation detected as a trigger to reassign a gesture dictionary. The system may identify the circumstances of the scenario in which the failure or unacceptable variation occurred based on one or more identifiers recognizable to the system. As described herein, the identifier may be any feature of the scenario that is identifiable by the system (e.g., the operating system, current user(s), application executing, a location, etc). For example, the system may identify a location via GPS or via an IP address. The system may identify a user may by capturing data representative of the user and employing body/facial recognition techniques. The system may identify the operating system or an application loaded by an analysis of the hardware/software configuration, such as by identifying the serial numbers of components labeled during installation.

The assignment of a gesture dictionary to a user may be done iteratively. Consider the example of a hierarchical dictionary as indicated above. In this example, the first step of the gesture calibration test may comprise determining whether Dictionary A 302 or Dictionary B 304 is appropriate for the user. A simple gesture calibration test may be presented to the user in which the user is presented with feedback corresponding to an example gesture and monitoring the gesture performed by the user. For example, assuming that both Dictionary A 302 and Dictionary B 304 have an exemplary gesture corresponding to a zoom function, the system may present feedback corresponding to a zoom function on a display and instruct the user to perform the appropriate gesture. If the user performs a gesture that matches the Dictionary A 302 zoom gesture (e.g., moves both arms in a predetermined manner), the system assigns Dictionary A 302 to the user. If the user performs the gesture that matches the Dictionary B 304 zoom gesture (e.g., moves fingers in a predetermined manner and limits movement of arms), the system assigns Dictionary B 304 to the user. The gesture calibration test may continue down the hierarchy to assign the most effective dictionary to the user based on repeated gesture calibration tests. For example, if Dictionary A 302 is assigned to a user, the system may conduct additional gesture calibration tests to determine whether Dictionary A.1 303a or Dictionary A.2 303b may be more effective for a particular user The iterative gesture calibration tests may be conducted over a short duration of time (e.g., several tests administered in succession) or over time (e.g., not more than once per time period, such as not more than once per day) or based on achievement (e.g., as the user reaches a predetermined threshold of gesture precision, the system could provide a gesture calibration test to determine whether a more precise dictionary may be preferable to the user).

Upon completion of a gesture calibration test and assignment, the system may present a tutorial, training, or other informational asset to the user regarding the assigned dictionary. For example, the system may provide a display (in sequence or simultaneously) of several gestures being performed for various actions. For example, there may be a display of a user (e.g., a video of a model, an avatar, etc.) performing gestures for stop, start, select, etc. based on the assigned dictionary. This could be in the context of a game, and the gesture dictionary could be refined over time (consistently adapting to a more precise dictionary). For example, the system may have a collection of dictionaries organized in a hierarchy and child dictionaries may further refine a family of dictionaries such that each leg of the hierarchy is unique at a certain level.

Referring back to FIG. 2, the information in the input gesture database 260 and the gesture set database 261 may be structured to enable a person or program to extract desired information to share information about the user. The input gesture database 260 and the gesture set database 261 may be any form of data storage, including a storage module, device, or memory, for example. The input gesture database 260 may store input gestures for a user, compiled for comparison with gesture dictionaries to continuously update the assignment of a gesture dictionary to a user as necessary. The gesture set database 261 may store the gesture dictionaries and identifiers and maintain the organization of dictionaries as they relate to each other and to each scenario. The databases 260, 261 may be provided as a database management system, an object-oriented database management system, a relational database management system (e.g. DB2, Access, etc), a file system, or another conventional database package. Further, the databases 260, 261 can be accessed via a Structure Query Language (SQL), or other tools known to one of ordinary skill in the art.

It is noted that the gesture based system may comprise any number of capture devices or computing environment components. The components may be connected locally or remotely, and a network 250 may facilitate communication of the various components. By connecting devices in a network or cloud, the gesture-based system can collect gesture data from a plurality of users, remote or local, and associate various identifiers depending on the features of each user and/or each user's respective computing environment.

In an embodiment, knowledge developed about a person on one device can be shared across devices, such as over network 250. In an example, if the system has recognized a user's thresholds or preferences during the user's first interaction with a gaming console or application, the person may have a faster learning process when interacting with a non-gaming system. As more specific and/or different dictionaries are assigned to a user as it relates to the first device, such as the gaming console, the user may be assigned to a different dictionary on another device. Thus, the assignment of a dictionary on a first device may cause the assigned dictionary related to a second device to be updated. A cluster of dictionaries for a first device, for example, may be assigned to a user if the system recognizes that a cluster of dictionaries were assigned to the user for a second device, where the cluster of dictionaries share similar characteristics or identifiers. For example, Dictionary A 302 family may define gestures for large arm motions, and children Dictionaries A.1 303a and A.2 303b may apply in a gaming and non-gaming and Dictionary B 304 may define gestures for small finger scale motions. If the system recognizes that the user is assigned to the Dictionary A.1 303a family in a gaming context, the system may initially assign Dictionary A.2 303b in a non-gaming context. Over time, the system may identify that the user actually performs small finger scale gestures in the non-gaming context and reassign the gesture dictionaries. But, the clustering technique may more efficiently assign gesture dictionaries upon initiation.

The computing environments on the same network can share files and access files and settings local to another computing environment, such as the captured gesture data. The gesture data on a local machine may be accessed from a remote computing environment in various manners. For example, gesture data may be streamed over a network, such as the Internet. A web browser may be viewable on the local computing environment 212, and the user may browse the Internet via the input/output component. The user may select or "click on" a gesture file that is accessible from a server 218 to download or stream to the user's local machine, such as computing device 212. The gesture data may be stored by the local computing environment as a copy or back-up version of the gesture profile that is accessible via the network. In some instances, a temporary gesture set may be cached or otherwise stored temporarily on a local machine. The information in the temporary gesture set may be used to refresh or add to a gesture set stored elsewhere, such as by uploading the gesture data to a central gesture database 261 via the network 250.

The network 250 may be any network arranged so that messages may be passed from one part of the network to another over any number of links or nodes. It is contemplated that any number of links or nodes may exist on the network, and any number of networks may be connected by at least one link or node from another network. For example, the computing environments 212, 216, 218, 219 may each be a node on the network 250. Each computing environment 212, 216, 218, 219 may execute applications but can also access other nodes (e.g., other computing environments) and applications executing on or devices connected to other nodes, anywhere on the network 250. Thus, a user of a local computing environment may use the network to share data (e.g., files, databases), interact with other applications, share devices (e.g., printers), communicate with other users (e.g., email, chat), etc. For example, a user 204 of computing environment 212 may access an application executing on the computing environment 216 via the user's local computing environment 212 via the network 250. Any number of users associated with any number of respective local computing environments may access the same application via the network 250.

Figure 6:
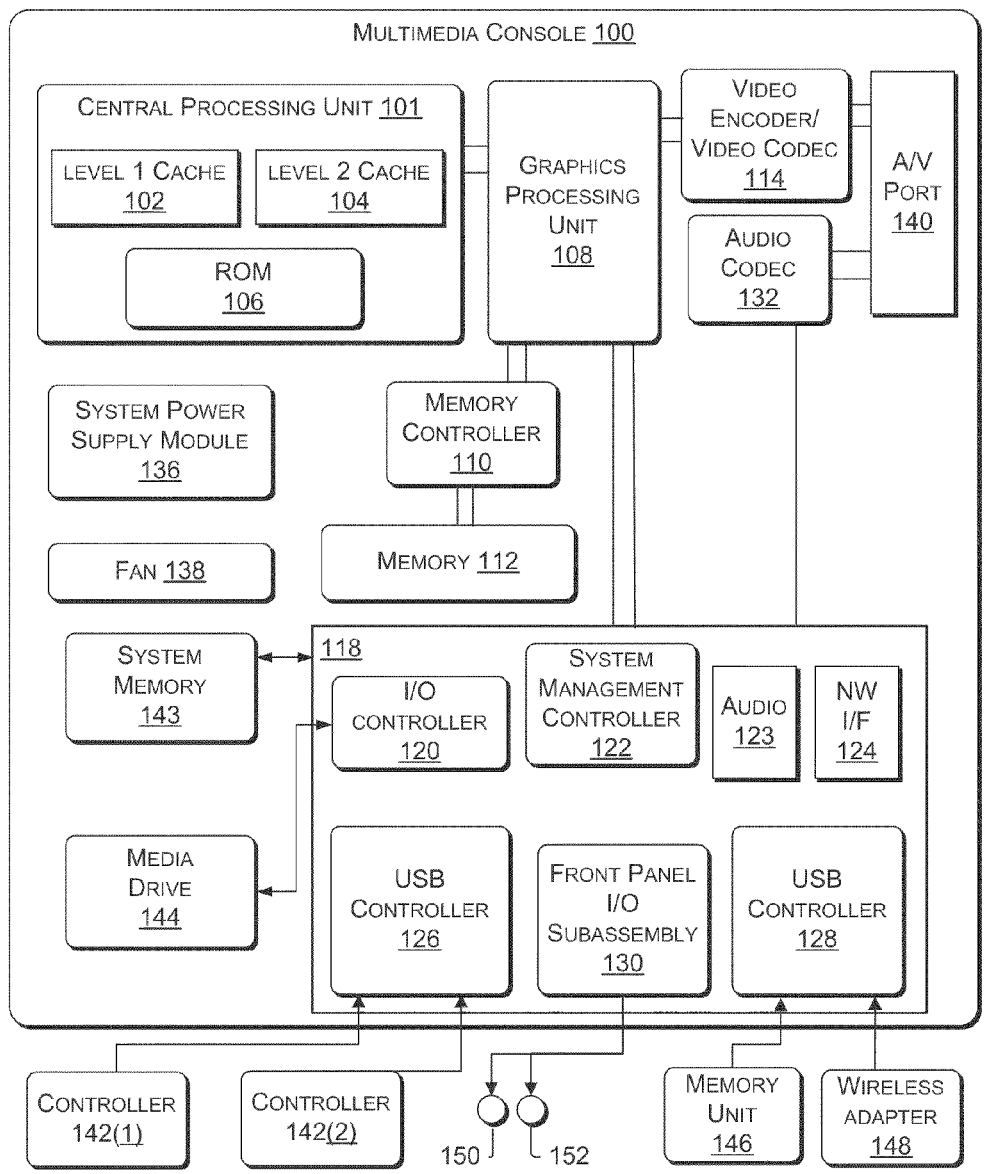
FIG. 6 illustrates an example embodiment of a computing environment in which the techniques described herein may be embodied.

There are a variety of systems, components, and network configurations that support networked computing environments. A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process uses the requested service without having to "know" any working details about the other program or the service itself In a client/server architecture, particularly a networked system, a client is usually a computer that accesses shared network resources provided by another computer, e.g., a server. In the example of FIG. 6, any computing environment 212, 216, 218, 219 can be considered a client, a server, or both, depending on the circumstances.

For example, the computing environment may be a server that serves several clients. A server 218 is typically, though not necessarily, a remote computer system accessible over a remote or local network 250, such as the Internet. The server may be the host for multi-user, multi-computing environments, providing services to clients on the network 250. The client process may be active in a first computer system, such as computing environment 212, and the server process may be active in a second computer system, such as server 218. The gesture set identification module 228 may assign dictionaries to users of the system or a system local to the user may be responsible for gesture dictionary assignment. The point is that any available processor or computing environment networked to the system may perform the functionality described herein. While the captured data 270 for remote users 204a, 204b, and 204c is provided remotely to the computing environment 218 for processing, it is contemplated that a respective computing environment that processes captured data may be associated locally with each of the users 204 and/or share a local environment with a capture device that captures data representative of each user. A gesture-based system may function entirely as a unit local to a user, where a local capture device captures data representative of the user and the local computing environment processes and recognizes gestures from the capture device for controlling aspects of the system. However, the local computing environment may provide the captured data and/or processed data to a remote component of the gesture-based system. Any of the users 204 may be remote to a computing environment that receives and/or processes the captured/processed data that represents the user or the user's gestures. It is noted that more than one user may occupy the same physical space, and a computing environment and/or capture device may be locally associated with more than one user.

The gesture set identification module 228 and gesture set calibration and assignment module 229 are units representative of hardware, software, or a combination thereof that may reside on the computing environment 218 or another part of the gesture-based system and perform the embodiments described herein. The gesture set identification module 228 and gesture set calibration and assignment module 229 are described in this specification as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

As described above, the gesture set identification module 228 and gesture set calibration and assignment module 229 may be located on an end user computing environment or a host environment. Thus, the evolution of the gesture sets or data that modifies a universally provided gesture set may be performed or stored locally or remotely from the computing environment associated locally with the user. If performed locally, a local gesture set identification module 228 and gesture set calibration and assignment module 229 may recognize updates to gesture data that are more effective for the users that interact directly with the local computing environment 218. Thus, the users that interact locally with the computing environment may benefit by an assignment of the gesture sets based on the users that interact directly with the computing environment. For a residence, for example, the gesture sets may be assigned to reflect the gestures as they are performed by a family that shares similar characteristics. The local users are obviously in the same region or location, but there may be further characteristics that users that interact directly with each other share. For example, members of a family may make gestures in a similar fashion simply as a result of having similar physical characteristics or interacting in a certain personal manner.

The gesture data may correspond to various controls, such as select file, open file, close file, power off, load an application, etc. For each gesture, the system may start with a generic description of the gesture properties. As described in more detail below with respect to the gesture recognition architecture, gesture information can include any identifiable parameter(s) of the user's gesture, including ranges, speeds, accelerations, velocities, etc. For example, a gesture may be represented by a trajectory of points of the user's body. As the user moves, a trajectory representing a sequence of points of the user's body may be tracked between captured images. If the trajectory resembles the trajectory defined for the gesture, or falls within an acceptable range for the trajectory defined for the gesture, the system may return an identity of that gesture. For example, a baseball throwing gesture or a portion thereof may have as a parameter a volume of space in which it must occur. This volume of space may typically be expressed in relation to the body where a gesture comprises body movement. For instance, a baseball throwing gesture for a right-handed user may be recognized only in the volume of space no lower than the right shoulder, and on the same side of the head as the throwing arm.

Figure 4:
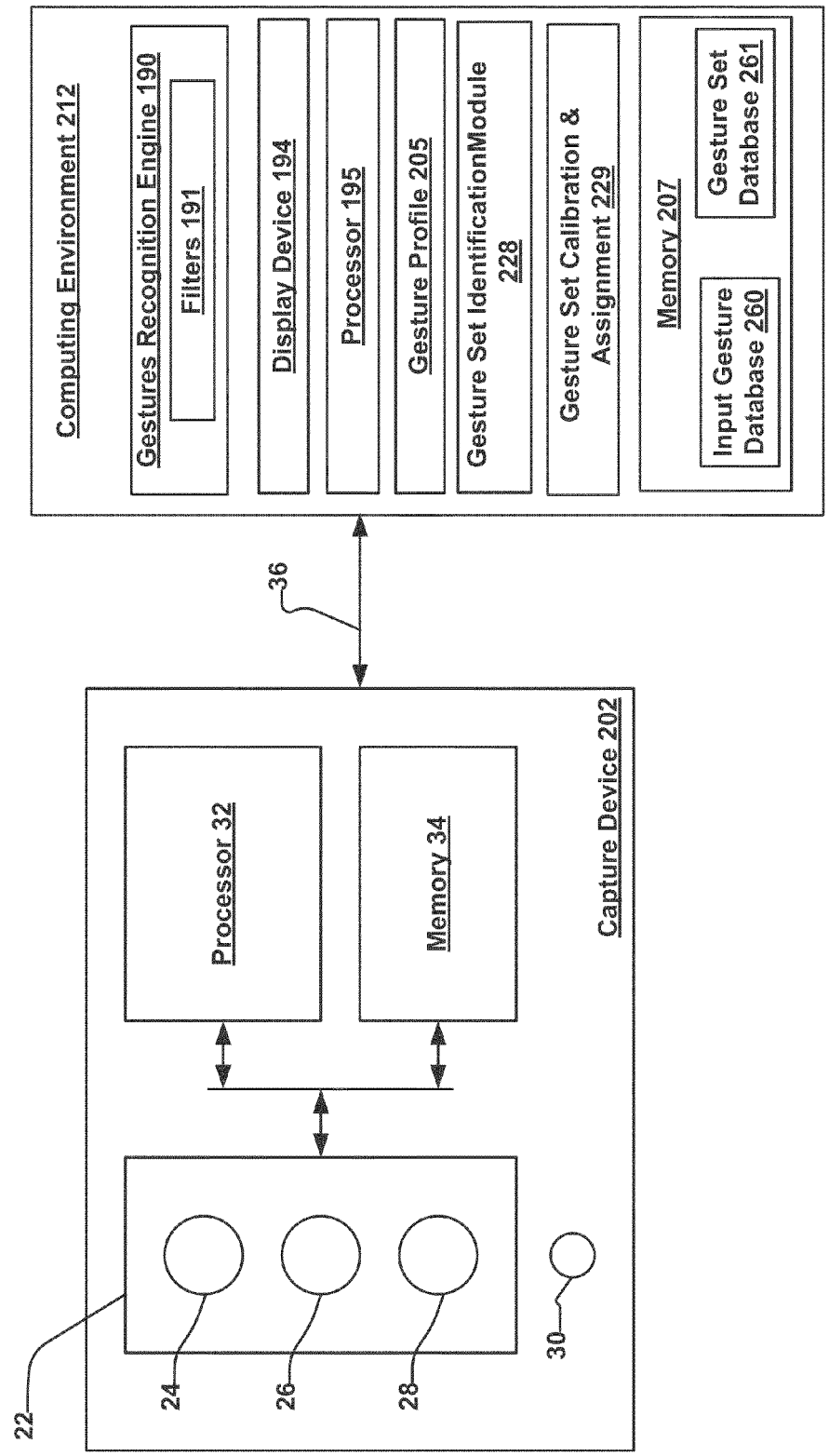
FIG. 4 illustrates an example embodiment of a capture device and computing environment that may be used in a target recognition, analysis, and tracking system.

FIG. 4 illustrates an example embodiment of the capture device 202 that may be used for target recognition, analysis, and tracking, where the target can be a user or an object. According to an example embodiment, the capture device 202 may be configured to capture video with depth information including a depth image that may include depth values via any suitable technique including, for example, time-of-flight, structured light, stereo image, or the like. According to one embodiment, the capture device 202 may organize the calculated depth information into "Z layers," or layers that may be perpendicular to a Z axis extending from the depth camera along its line of sight.

As shown in FIG. 4, the capture device 202 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 4, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 202 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 202 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 202 to a particular location on the targets or objects. The camera component 22 may include other components for identifying features of a user in the physical space. For example, an accelerometer may detect accelerations of a user's body parts, or a gyroscope may detect an orientation of an object the user is holding.

According to another example embodiment, time-of-flight analysis may be used to indirectly determine a physical distance from the capture device 202 to a particular location on the targets or objects by analyzing the intensity of the reflected beam of light over time via various techniques including, for example, shuttered light pulse imaging.

In another example embodiment, the capture device 202 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 202 to a particular location on the targets or objects.

According to another embodiment, the capture device 202 may include two or more physically separated cameras that may view a scene from different angles, to obtain visual stereo data that may be resolved to generate depth information. In another example embodiment, the capture device 202 may use point cloud data and target digitization techniques to detect features of the user.

The capture device 202 may further include a microphone 30, or an array of microphones. The microphone 30 may include a transducer or sensor that may receive and convert sound into an electrical signal. According to one embodiment, the microphone 30 may be used to reduce feedback between the capture device 202 and the computing environment 212 in the target recognition, analysis, and tracking system 10. Additionally, the microphone 30 may be used to receive audio signals that may also be provided by the user to control applications such as game applications, non-game applications, or the like that may be executed by the computing environment 212.

In an example embodiment, the capture device 202 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction. For example, the computer-readable medium may comprise computer executable instructions for receiving data of a scene, wherein the data includes data representative of the target in a physical space. The instructions comprise instructions for gesture profile personalization and gesture profile roaming, as described herein.

The capture device 202 may further include a memory component 34 that may store the instructions that may be executed by the processor 32, images or frames of images captured by the 3-d camera 26 or RGB camera 28, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 4, the capture device 202 may be in communication with the computing environment 212 via a communication link 36. The communication link 36 may be a wired connection including, for example, a USB connection, a Fire wire connection, an Ethernet cable connection, or the like and/or a wireless connection such as a wireless 802.11b, g, a, or n connection. According to one embodiment, the computing environment 212 may provide a clock to the capture device 202 that may be used to determine when to capture, for example, a scene via the communication link 36.

Additionally, the capture device 202 may provide the depth information and images captured by, for example, the 3-D camera 26 and/or the RGB camera 28, and a skeletal model that may be generated by the capture device 202 to the computing environment 212 via the communication link 36. The computing environment 212 may then use the skeletal model, depth information, and captured images to, for example, control an application such as a game or word processor.

As shown, in FIG. 4, the computing environment 212 may include a memory 207, having an input gesture database 260 and a gesture set database 261, and a gestures recognition engine 190. The gestures recognition engine 190 may include a collection of gesture filters 191. A filter may comprise code and associated data that can recognize gestures or otherwise process depth, RGB, or skeletal data. Each filter 191 may comprise information defining a gesture along with parameters, or metadata, for that gesture. For instance, a throw, which comprises motion of one of the hands from behind the rear of the body to past the front of the body, may be implemented as a gesture filter 191 comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

While it is contemplated that the gestures recognition engine 190 may include a collection of gesture filters, where a filter may comprise code or otherwise represent a component for processing depth, RGB, or skeletal data, the use of a filter is not intended to limit the analysis to a filter. The filter is a representation of an example component or section of code that analyzes data of a scene received by a system, and comparing that data to base information that represents a gesture. As a result of the analysis, the system may produce an output corresponding to whether the input data corresponds to the gesture. The base information representing the gesture may be adjusted to correspond to the recurring feature in the history of data representative of the user's capture motion. The base information, for example, may be part of a gesture filter as described above. But, any suitable manner for analyzing the input data and gesture data is contemplated.

In an example embodiment, a gesture may be recognized as a trigger for the entry into a modification mode, where a user can modify gesture parameters in the user's gesture profile. For example, a gesture filter 191 may comprise information for recognizing a modification trigger gesture. If the modification trigger gesture is recognized, the application may go into a modification mode. The modification trigger gesture may vary between applications, between systems, between users, or the like. For example, the same gesture in a tennis gaming application may not be the same modification trigger gesture in a bowling game application.

The data captured by the cameras 26, 28 and device 202 in the form of the skeletal model and movements associated with it may be compared to the gesture filters 191 in the gesture set database 261 to identify when a user (as represented by the skeletal model) has performed one or more gestures. Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 212 may include a processor 195 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 202 itself, and the raw image data of depth and color (where the capture device 202 comprises a 3D camera 26) values are transmitted to the computing environment 212 via link 36. In another embodiment, the processing is performed by a processor 32 coupled to the camera 402 and then the parsed image data is sent to the computing environment 212. In still another embodiment, both the raw image data and the parsed image data are sent to the computing environment 212. The computing environment 212 may receive the parsed image data but it may still receive the raw data for executing the current process or application. For instance, if an image of the scene is transmitted across a computer network to another user, the computing environment 212 may transmit the raw data for processing by another computing environment.

The computing environment 212 may use the gesture set database 261 along with a gesture profile 205 such as that shown in FIG. 2 to interpret movements of the skeletal model and to control an application based on the movements. The computing environment 212 can model and display a representation of a user, such as in the form of an avatar or a pointer on a display, such as in a display device 193. Display device 193 may include a computer monitor, a television screen, or any suitable display device, such as a contact lens or an embedded display. For example, a camera-controlled computer system may capture user image data and display user feedback on a television screen that maps to the user's gestures. The user feedback may be displayed as an avatar on the screen such as shown in FIG. 1. The avatar's motion can be controlled directly by mapping the avatar's movement to those of the user's movements. The user's gestures may be interpreted control certain aspects of the application.

The gesture data base may be locally or remotely stored on a media, e.g., a removable or non-removable media, on a computing environment, e.g., memory 207 on computing environment 212 The media can be removable storage and/or non-removable storage including, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information. The storage media may be implemented in any method or technology for storage of information such as computer readable instructions, data structures, program modules, or other data. The According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store a gesture profile 205 associated with the user in a computing environment such as computing environment 212. The gesture profile 205 may be specific to a user, application, or a system. The gesture profile 205 may be accessible via an application or be available system-wide, for example. The gesture profile 205 may include lookup tables for loading specific user profile information. The virtual screen may interact with an application that may be executed by the computing environment 212 described above with respect to FIG. 1.

The gesture profile 205 may include user identification data such as, among other things, the target's scanned or estimated body size, skeletal models, body models, voice samples or passwords, the target's gender, the targets age, previous gestures, target limitations and standard usage by the target of the system, such as, for example a tendency to sit, left or right handedness, or a tendency to stand very near the capture device. This information may be used to determine if there is a match between a target in a capture scene and one or more users. If there is a match, the gesture profiles 205 for the user may be loaded and, in one embodiment, may allow the system to adapt the gesture recognition techniques to the user, or to adapt other elements of the computing or gaming experience according to the gesture profile 205.

One or more gesture profiles 205 may be stored in computer environment 212 and used in a number of user sessions, or one or more profiles may be created for a single session only. Users may have the option of establishing a profile where they may provide information to the system such as a voice or body scan, age, personal preferences, right or left handedness, an avatar, a name or the like. Gesture profiles may also be generated or provided for "guests" who do not provide any information to the system beyond stepping into the capture space. A temporary personal profile may be established for one or more guests. At the end of a guest session, the guest gesture profile may be stored or deleted. The information available in the gesture profile 205 may help the system assign a dictionary. For example, if an identifier associated with a particular gesture dictionary is based on a physical feature of the user, information in the gesture profile may match the identifier, and the system may assign the dictionary to the user based on the match.

The databases 260, 261, gestures recognition engine 190, gesture profile 205, and modules 228, 229 may be implemented in hardware, software or a combination of both. For example, the gestures recognition engine 190 may be implemented as software that executes on a processor, such as processor 195, of the computing environment 212 (or on processing unit 101 of FIG. 6 or processing unit 259 of FIG. 7).

It is emphasized that the block diagrams depicted in FIG. 4 and FIGS. 6 and 7 described below are exemplary and not intended to imply a specific implementation. Thus, the processor 195 or 32 in FIG. 4, the processing unit 101 of FIG. 6, and the processing unit 259 of FIG. 7, can be implemented as a single processor or multiple processors. Multiple processors can be distributed or centrally located. For example, the gesture set database 261 may be implemented as software that executes on the processor 32 of the capture device or it may be implemented as software that executes on the processor 195 in the computing environment 212. Any combinations of processors that are suitable for performing the techniques disclosed herein are contemplated. Multiple processors can communicate wirelessly, via hard wire, or a combination thereof.

Figure 5A:
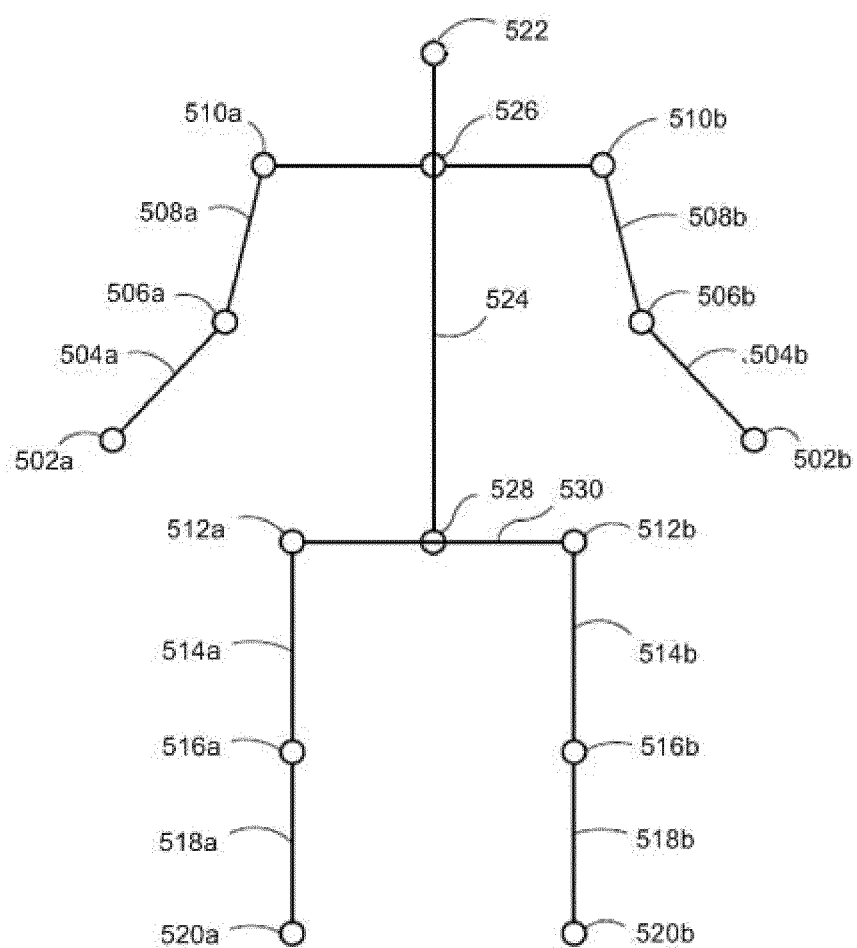
FIG. 5A illustrates a skeletal mapping of a user that has been generated from a target recognition, analysis, and tracking system such as that shown in FIG. 3.

FIG. 5A depicts an example skeletal mapping of a user that may be generated from the capture device 202. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may be a single movement (e.g., a jump) or a continuous gesture (e.g., driving), and may be short in duration or long in duration (e.g., driving for 202 minutes). A gesture may comprise a motion of the user's eyes. For example, a gesture may comprise eye movement, where the system may track the user's eyes and detect a particular direction or pattern of movement. A gesture may also incorporate props, such as by swinging a mock sword. A gesture may comprise more than one body part, such as clapping the hands 502 together, or a subtler motion, such as pursing one's lips. As described above, a gesture may comprise additional inputs, such as voice commands or tactile inputs.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 202. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and breaking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned gesture animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as −1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture are important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. Likewise, a parameter of a transition point could be the identification of the grab gesture, where if the user only partially extends his arm 502-510, thereby not achieving the result of interacting with the ball, the user's gesture also will not meet the parameters of the transition point.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510*a*, and on the same side of the head 522 as the throwing arm 502*a*-310*a*. It may not be necessary to define all bounds of a volume, such as with this throwing gesture, where an outer bound away from the body is left undefined, and the volume extends out indefinitely, or to the edge of scene that is being monitored.

Figure 5B:
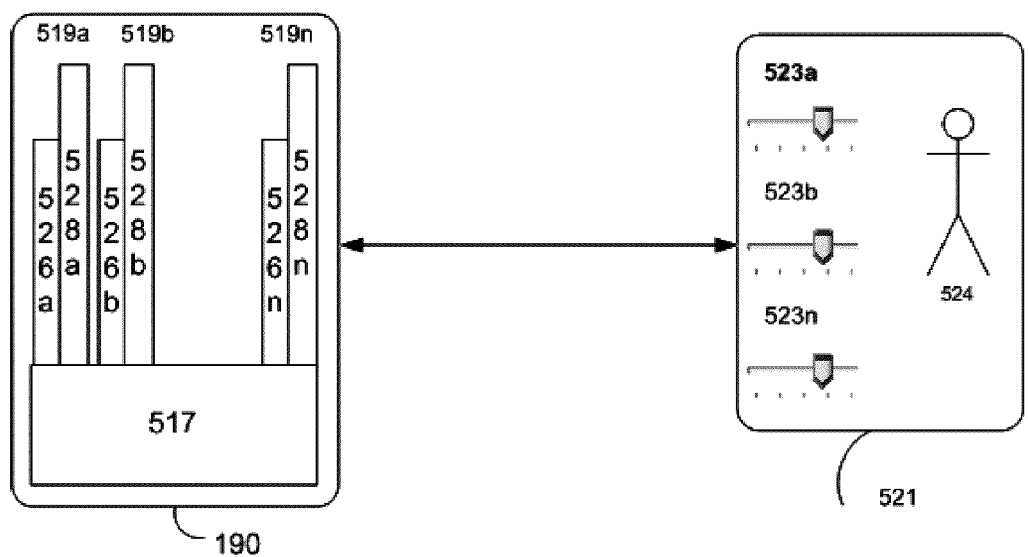
FIG. 5B illustrates further details of a gesture recognizer architecture such as that shown in FIG. 4.

FIG. 5B provides further details of one exemplary embodiment of the gesture recognizer engine 190 of FIG. 2. As shown, the gesture recognizer engine 190 may comprise at least one filter 519 to determine a gesture or gestures. A filter 519 comprises information defining a gesture 526 (hereinafter referred to as a "gesture"), and may comprise at least one parameter 528, or metadata, for that gesture 526. For instance, a throw, which comprises motion of one of the hands from behind the rear of the body to past the front of the body, may be implemented as a gesture 526 comprising information representing the movement of one of the hands of the user from behind the rear of the body to past the front of the body, as that movement would be captured by the depth camera. Parameters 528 may then be set for that gesture 526. Where the gesture 526 is a throw, a parameter 528 may be a threshold velocity that the hand has to reach, a distance the hand must travel (either absolute, or relative to the size of the user as a whole), and a confidence rating by the recognizer engine 190 that the gesture 526 occurred. These parameters 528 for the gesture 526 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine 190 architecture. For instance, there may be a first filter for driving that takes as input skeletal data and outputs a confidence that the gesture 526 associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter 528. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The gesture recognizer engine 190 may have a base recognizer engine 517 that provides functionality to a gesture filter 519. In an embodiment, the functionality that the recognizer engine 517 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 519 are loaded and implemented on top of the base recognizer engine 517 and can utilize services provided by the engine 517 to all filters 519. In an embodiment, the base recognizer engine 517 processes received data to determine whether it meets the requirements of any filter 519. Since these provided services, such as parsing the input, are provided once by the base recognizer engine 517 rather than by each filter 519, such a service need only be processed once in a period of time as opposed to once per filter 519 for that period, so the processing required to determine gestures is reduced.

An application may use the filters 519 provided by the recognizer engine 190, or it may provide its own filter 519, which plugs in to the base recognizer engine 517. Similarly, the gesture profile may plug in to the base recognizer engine 517. In an embodiment, all filters 519 have a common interface to enable this plug-in characteristic. Further, all filters 519 may utilize parameters 528, so a single gesture tool as described below may be used to debug and tune the entire filter system 519.

These parameters 528 may be tuned for an application or a context of an application by a gesture tool 521. In an embodiment, the gesture tool 521 comprises a plurality of sliders 523, each slider 523 corresponding to a parameter 528, as well as a pictorial representation of a body 524. As a parameter 528 is adjusted with a corresponding slider 523, the body 524 may demonstrate both actions that would be recognized as the gesture with those parameters 528 and actions that would not be recognized as the gesture with those parameters 528, identified as such. This visualization of the parameters 528 of gestures provides an effective means to both debug and fine tune a gesture.

The computer executable instructions may comprise instructions for roaming a gesture profile, comprising instructions for identifying the gesture profile associated with a user, wherein the gesture profile comprises personalized gesture information for the user, and wherein the personalized gesture information is derived from data captured by a capture device and representative of a user's position or motion in a physical space; and roaming the gesture profile via a network connection. The instructions may further comprise instructions for receiving a request for the gesture profile, activating the gesture profile based on an identity of the user, and identifying the user from profile data.

The computer executable instructions may also comprise instructions for gesture recognition based on a user's gesture profile, including instructions for activating a gesture profile associated with a user, wherein the gesture profile comprises personalized gesture information for the user, and wherein the personalized gesture information is derived from data captured by a capture device and representative of a user's position or motion in a physical space; and recognizing a user's gesture by comparing the received data to the personalized gesture information in the gesture profile.

FIG. 6 illustrates an example embodiment of a computing environment that may be used to interpret one or more gestures in a target recognition, analysis, and tracking system. The computing environment such as the computing environment 212 described above with respect to FIG. 1 may be a multimedia console 100, such as a gaming console. As shown in FIG. 6, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button lnposelstart152lnposelend, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 202 may define additional input devices for the console 100.

Figure 7:
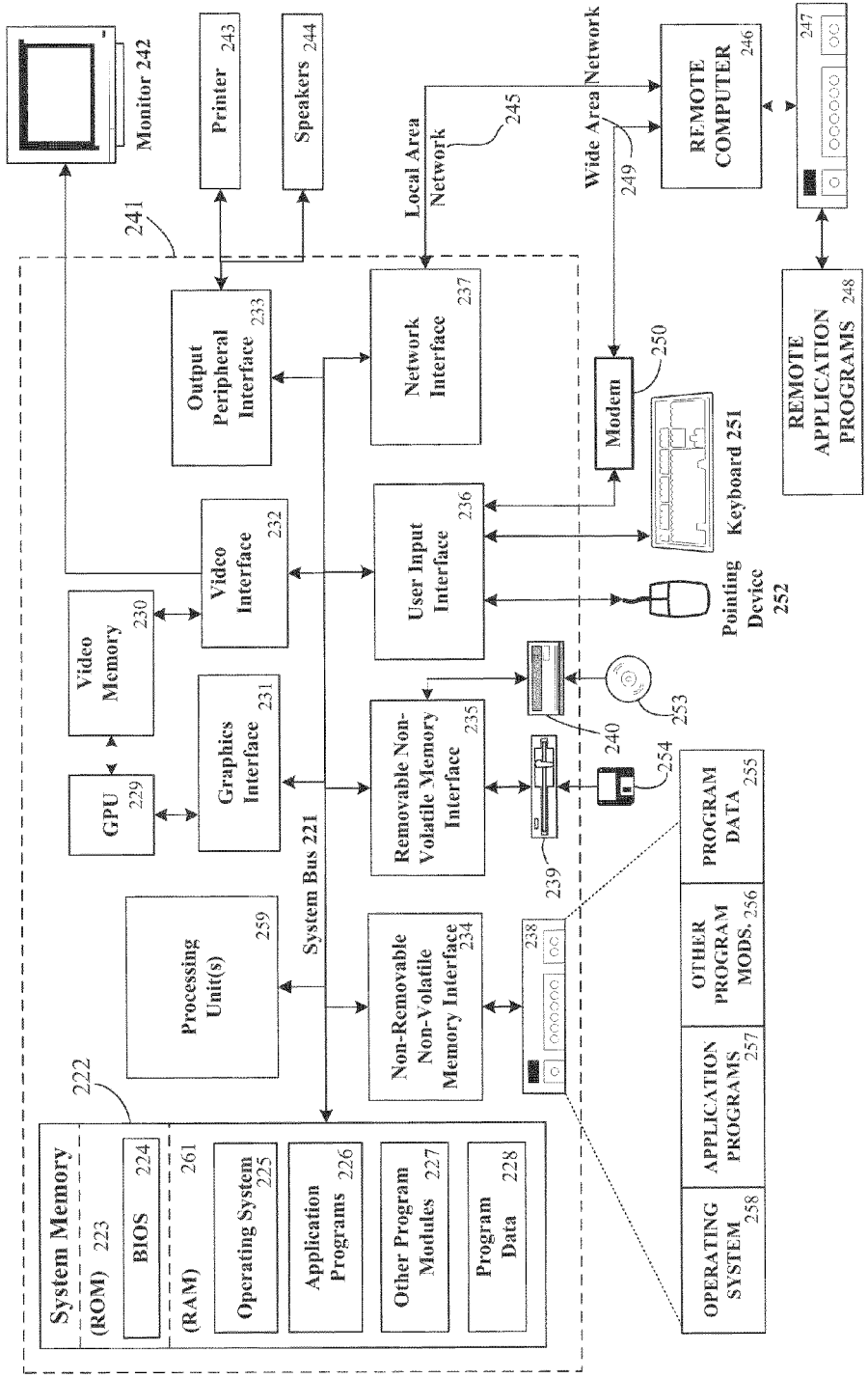
FIG. 7 illustrates another example embodiment of a computing environment in which the techniques described herein may be embodied.

FIG. 7 illustrates another example embodiment of a computing environment 220 that may be the computing environment 212 shown in FIG. 1 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 7, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 261. A basic input/output system 224 (BIOS), containing the basic routines that help to transfer information between elements within computer 241, such as during start-up, is typically stored in ROM 223. RAM 261 typically contains data and/or program modules that are immediately accessible to and/or presently being operated on by processing unit 259. By way of example, and not limitation, FIG. 7 illustrates operating system 225, application programs 226, other program modules 227, and program data 228.

The computer 241 may also include other removable/non-removable, volatile/nonvolatile computer storage media. By way of example only, FIG. 7 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 7, provide storage of computer readable instructions, data structures, program modules and other data for the computer 241. In FIG. 7, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 202 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 7. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 7 illustrates remote application programs 248 as residing on memory device 247. It will be appreciated that the network connections shown are exemplary and other means of establishing a communications link between the computers may be used.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and sub-combinations of the various processes, systems and configurations, and other features, functions, acts, and/or properties disclosed herein, as well as any and all equivalents thereof Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A method for assigning a gesture dictionary, the method comprising:
    receiving data representative of a user in a physical space;
    processing the received data to identify a first motion or pose by the user that invokes an input command to a computer;
    correlating the first motion or pose to a first gesture dictionary of a plurality of gesture dictionaries, each gesture dictionary of the plurality of gesture dictionaries comprising a set of input commands to the computer that may be invoked by motions or poses of the user reflected in the received data; and
    assigning the first gesture dictionary to the user, the first gesture dictionary corresponding to the first motion or pose; and
    processing additional captured data with the first gesture dictionary to identify whether a second motion or pose by the user in the additional captured data invokes an input command to the computer.

2. The method of claim 1, further comprising requesting explicit gesture feedback from the user via instructions to the user to perform a gesture.

3. The method of claim 2, wherein the instructions comprise a display of a command and a request to the user to perform the gesture that corresponds to the command.

4. The method of claim 1, further comprising passively tracking the user and compiling captured data for processing to identify additional motions or poses by the user.

5. The method of claim 4, further comprising manipulating circumstances of an output to the user to elicit particular input gesture data.

6. The method of claim 1, wherein correlating the first motion or pose to at least one of the plurality of gesture dictionaries comprises correlating the first motion or pose to a cluster of gesture dictionaries.

7. The method of claim 1, wherein the user is a first user and correlating the first motion or pose to the at least one of the plurality of gesture dictionaries comprises:
    correlating the first motion or pose of the first user to an input gesture data of a second user, and assigning a gesture dictionary assigned to the second user to the first user.

8. The method of claim 1, wherein the at least one of the plurality of gesture dictionaries is associated an identifier, wherein the identifier identifies when to implement the at least one of the plurality of gesture dictionaries.

9. The method of claim 8, wherein the identifier is at least one of an operating system, an application, a user, a feature of a user, a location, a type of application, a hardware configuration, a software configuration, a culture, current user, geography, demography, linguistic, culture, or a style.

10. The method of claim 1, wherein the gesture dictionary is assigned to the user in real time upon capturing the data representative of the user.

11. The method of claim 1, the method further comprising:
compiling captured data representative of the user;
identifying at least one identifier associated with the user;
correlating the at least one identifier to the plurality of gesture dictionaries;
assigning a portion of each of the plurality of gesture dictionaries correlating to the identifier to the user, such that a combination of data from each of the plurality of gesture dictionaries is assigned to the user.

12. The method of claim 1, further comprising:
identifying a level of failure of the first motion or pose to correspond to data in the gesture dictionary, and
providing instructional feedback to the user.

13. A system for assigning a gesture dictionary, the system comprising:
a memory communicatively coupled to a processor when the system is operational, the memory bearing processor-executable instructions that, when executed on the processor, cause the system: at least to:
receive data representative of a user in a physical space;
process the received data to identify a first motion or pose by the user that invokes an input command to a computer;
correlate the first motion or pose to a first gesture dictionary of a plurality of gesture dictionaries, each gesture dictionary of the plurality of gesture dictionaries comprising a set of input commands to the computer that may be invoked by motions or poses of the user reflected in the received data; and
assign the at least one of the plurality of gesture dictionaries to the user, the gesture dictionary corresponding to the first motion or pose; and
process additional captured data with the first gesture dictionary to identify whether a second motion or pose by the user in the additional captured data invokes an input command to the computer.

14. The system of claim 13, wherein the memory further bears processor-executable instructions that, when executed on the processor, cause the system: at least to:
request explicit gesture feedback from the user via instructions to the user to perform a gesture.

15. The system of claim 14, wherein the memory further bears processor-executable instructions that, when executed on the processor, cause the system: at least to:
display a command on a display device and a request to the user to perform the gesture that corresponds to the command.

16. The system of claim 13, wherein the memory further bears processor-executable instructions that, when executed on the processor, cause the system at least to:
passively tracking the user and compiling captured data for processing to identify additional motions or poses by the user.

17. A computer-readable storage device bearing computer-executable instructions that, when executed on a computer, cause the computer to perform operations comprising:
receiving data representative of a user in a physical space;
processing the received data to identify a first motion or pose by the user that invokes an input command to the computer;
correlating the first motion or pose to a first gesture dictionary of a plurality of gesture dictionaries, each gesture dictionary of the plurality of gesture dictionaries comprising a set of input commands to the computer that may be invoked by motions or poses of the user reflected in the received data; and
assigning the first gesture dictionary to the user, the first gesture dictionary corresponding to the first motion or pose; and
processing additional captured data with the first gesture dictionary to identify whether a second motion or pose by the user in the additional captured data invokes an input command to the computer.

18. The computer-readable storage device of claim 17, wherein correlating the first motion or pose to the first gesture dictionary comprises:
determining whether the user is left-handed or right-handed; and
wherein assigning the first gesture dictionary to the user comprises: assigning the first gesture dictionary to the user based on whether the user is left-handed or right-handed.

19. The computer-readable storage device of claim 17, wherein capturing data representative of the user in the physical space comprises:
powering down a component of the computer or a component communicatively coupled to the computer; and
capturing data representative of the user performing a motion or pose to power up the component of the computer or the component communicatively coupled to the computer.

20. The computer-readable storage device of claim 17, wherein correlating the first motion or pose to the first gesture dictionary comprises:
determining a physical location or Internet Protocol (IP) address of the user; and
correlating the first motion or pose and the physical location or IP address of the user to the first gesture dictionary of a plurality of gesture dictionaries.

21. The computer-readable storage device of claim 17, wherein correlating the first motion or pose to the first gesture dictionary comprises:
determining a skill level of the user; and
correlating the first motion or pose and the skill level of the user to the first gesture dictionary of a plurality of gesture dictionaries.

* * * * *